United States Patent
Zhuang et al.

(10) Patent No.: US 12,328,368 B2
(45) Date of Patent: Jun. 10, 2025

(54) SESSION SYNCHRONIZATION METHOD, APPARATUS AND SYSTEM, AND FIRST NODE, SECOND NODE AND MEDIUM

(71) Applicant: Beijing Bytedance Network Technology Co., Ltd., Beijing (CN)

(72) Inventors: Yan Zhuang, Beijing (CN); Nan Chen, Beijing (CN); Shuzhen Cao, Beijing (CN); Lebing Wan, Beijing (CN)

(73) Assignee: Beijing Bytedance Network Technology Co., Ltd. (CN)

( * ) Notice: Subject to any disclaimer, the term of this patent is extended or adjusted under 35 U.S.C. 154(b) by 0 days.

(21) Appl. No.: 18/548,884

(22) PCT Filed: Mar. 2, 2022

(86) PCT No.: PCT/CN2022/078743
§ 371 (c)(1),
(2) Date: Sep. 1, 2023

(87) PCT Pub. No.: WO2022/184085
PCT Pub. Date: Sep. 9, 2022

(65) Prior Publication Data
US 2024/0056505 A1 Feb. 15, 2024

(30) Foreign Application Priority Data
Mar. 4, 2021 (CN) .......................... 202110241745.7

(51) Int. Cl.
*H04L 12/00* (2006.01)
*H04L 67/104* (2022.01)
(Continued)

(52) U.S. Cl.
CPC .......... *H04L 67/142* (2013.01); *H04L 67/104* (2013.01); *H04L 69/24* (2013.01)

(58) Field of Classification Search
CPC ..... H04L 45/16; H04L 67/142; H04L 67/104; H04L 67/1095; H04L 69/24; H04L 69/164
(Continued)

(56) References Cited

U.S. PATENT DOCUMENTS 8,301,790 B2 * 10/2012 Morrison ............. G10H 1/0058
709/248
8,918,541 B2 * 12/2014 Morrison ............. G10H 1/0058
709/248
(Continued)

FOREIGN PATENT DOCUMENTS

CN 107454000 A 12/2017
CN 109150659 A 1/2019
(Continued)

OTHER PUBLICATIONS

Li G, CN107454000A—Network data transmission device and method, pp. 1-6, 2016.*
(Continued)

*Primary Examiner* — Frantz Coby

(57) ABSTRACT

Provide are a session synchronization method, a session synchronization apparatus, a session synchronization system, a first node, a second node, and a medium. The session synchronization method includes sending a first negotiation message to at least one node in a cluster through a first central processing unit (CPU) core and determining a second node according to at least one received second negotiation message; sending a third negotiation message to the second node through the first CPU core; in the case where a fourth negotiation message sent from the second node is received through the first CPU core, receiving the user datagram protocol (UDP) message sent from the second node through a second CPU core; and synchronizing the session of the
(Continued)

second node according to the UDP message through the second CPU core.

20 Claims, 10 Drawing Sheets

(51) Int. Cl.
  *H04L 67/142* (2022.01)
  *H04L 69/24* (2022.01)
(58) Field of Classification Search
  USPC .................................................. 709/206, 248
  See application file for complete search history.

(56) References Cited

U.S. PATENT DOCUMENTS

| | | | |
|---|---|---|---|
| 9,654,817 B2 * | 5/2017 | Li | .................... H04N 21/41407 |
| 2004/0117507 A1 | 6/2004 | Torma | |
| 2009/0094369 A1 | 4/2009 | Wooldridge et al. | |
| 2013/0024865 A1 | 1/2013 | Yamauchi et al. | |
| 2020/0351562 A1 * | 11/2020 | Siddique | ............ H04N 21/4788 |

FOREIGN PATENT DOCUMENTS

| | | |
|---|---|---|
| CN | 109474446 A | 3/2019 |
| CN | 109495526 A | 3/2019 |
| CN | 110177047 A | 8/2019 |
| CN | 110247803 A | 9/2019 |
| CN | 111083215 A | 4/2020 |
| CN | 111107166 A | 5/2020 |
| CN | 112217735 A | 1/2021 |
| CN | 112769959 A | 5/2021 |

OTHER PUBLICATIONS

International Search Report issued May 25, 2022 in PCT Appl. No. PCT/CN2022/078743, English translation (4 pages).

* cited by examiner

SESSION SYNCHRONIZATION METHOD, APPARATUS AND SYSTEM, AND FIRST NODE, SECOND NODE AND MEDIUM

CROSS-REFERENCE TO RELATED APPLICATION(S)

This is a national stage application filed under 37 U.S.C. 371 based on International Patent Application No. PCT/CN2022/078743, filed Mar. 2, 2022, which claims priority to Chinese Patent Application No. 202110241745.7 filed with the China National Intellectual Property Administration (CNIPA) on Mar. 4, 2021, the disclosures of which are incorporated herein by reference in their entireties.

TECHNICAL FIELD

The present disclosure relates to the field of network access technology, a session synchronization method, a session synchronization apparatus, a session synchronization system, a first node, a second node, and a medium.

BACKGROUND

Four-layer load balancers are deployed in a cluster manner in a Top of Rack (ToR) network cluster. When a node (such as an access gateway or a load balancer) is failed, the service traffic passing through this node before the failure is distributed to other nodes in a cluster. However, a four-layer session on the failed node is not replicated by other nodes, resulting in that a client needs to reestablish connections to the other nodes. To provide high availability, each node in a cluster needs to perform hot synchronization on its own main session to other nodes through a session establishment message, and after the main session is closed, each node also needs to perform hot synchronization on the close of main session to other nodes through a session close message, that is, the establishment and close of the main session of each node need to be synchronized throughout the cluster.

However, the session synchronization mechanism based on hot synchronization cannot ensure that the original session of a failed node is completely restored, and service damage is easily caused. For example, since the service traffic of a client is not continuous, the original session S1 of a failed node may be kept as a slave session in other nodes. In this case, after the failed node is announced to be online, other nodes cannot synchronize the session S1 to the failed node, and as a result, the session of the failed node cannot be completely restored or synchronized. The failed node needs to reestablish a connection to the client to obtain the session S1, which affects synchronization efficiency.

SUMMARY

The present disclosure provides a session synchronization method, a session synchronization apparatus, a session synchronization system, a first node, a second node, and a medium to ensure the integrity of session synchronization and improve synchronization efficiency.

In a first aspect, embodiments of the present disclosure provide a session synchronization method, including:
sending a first negotiation message to at least one node in a cluster through a first central processing unit (CPU) core and determining a second node according to at least one received second negotiation message;
sending a third negotiation message to the second node through the first CPU core;
in a case where a fourth negotiation message sent from the second node is received through the first CPU core, receiving a user datagram protocol (UDP) message sent from the second node through a second CPU core; and
synchronizing a session of the second node through the second CPU core according to the UDP message.

In a second aspect, embodiments of the present disclosure provide a session synchronization method including:
listening to a first negotiation message through a third CPU core and sending a second negotiation message to a first node that sends the first negotiation message;
receiving a third negotiation message sent from the first node through the third CPU core and sending a fourth negotiation message to the first node through the third CPU core; and
encapsulating a session of the second node in a UDP message through a fourth CPU core and sending the UDP message to the first node.

In a third aspect, embodiments of the present disclosure provide a session synchronization apparatus including:
a first negotiation module configured to send a first negotiation message to at least one node in a cluster through a first CPU core and determine a second node according to at least one received second negotiation message;
a second negotiation module configured to send a third negotiation message to the second node through the first CPU core;
a message receiving module configured to, in a case where a fourth negotiation message sent from the second node is received through the first CPU core, receive a UDP message sent from the second node through a second CPU core; and
a synchronization module configured to synchronize a session of the second node according to the UDP message through the second CPU core.

In a fourth aspect, embodiments of the present disclosure provide a session synchronization apparatus including:
a third negotiation module configured to listen to a first negotiation message through a third CPU core and send a second negotiation message to a first node that sends the first negotiation message;
a fourth negotiation module configured to receive a third negotiation message sent from the first node through the third CPU core and send a fourth negotiation message to the first node through the third CPU core; and
a message sending module configured to encapsulate a session of the second node in a UDP message through a fourth CPU core and send the UDP message to the first node.

In a fifth aspect, embodiments of the present disclosure provide a first node including:
one or more processors; and
a storage apparatus configured to store one or more programs,
where when executing the one or more programs, the one or more processors perform the session synchronization method described in the first aspect.

In a sixth aspect, embodiments of the present disclosure provide a second node including:
one or more processors; and
a storage apparatus configured to store one or more programs,
where when executing the one or more programs, the one or more processors perform the session synchronization method described in the second aspect.

In a seventh aspect, the present disclosure also provides a session synchronization system. The system includes the first node described in the fifth aspect and the second node described in the sixth aspect, where the first node and the second node are deployed in the same virtual Internet protocol (VIP).

In an eighth aspect, the present disclosure also provides a computer-readable medium storing a computer program. The computer program, when executed by a processor, performs the session synchronization method described in the embodiments of the present disclosure.

DETAILED DESCRIPTION

Embodiments of the present disclosure are described below with reference to the drawings. The drawings illustrate some embodiments of the present disclosure, but it should be understood that the present disclosure may be implemented in various manners and should not be limited to the embodiments set forth herein. The drawings and embodiments of the present disclosure are merely for illustrative purposes and are not intended to limit the scope of the present disclosure.

The various steps recited in method embodiments of the present disclosure may be performed in a different order and/or in parallel. In addition, the method embodiments may include additional steps and/or omit execution of illustrated steps. The scope of the present disclosure is not limited in this respect.

The term "comprise" and variations thereof are intended to be inclusive, that is, "including, but not limited to". The term "based on" is "at least partially based on". The term "an embodiment" indicates "at least one embodiment".

"One" and "a plurality" mentioned in the present disclosure are illustrative, are not intended to limit the present disclosure, and should be understood as "one or more" unless expressed in the context.

The names of messages or information exchanged between multiple apparatuses in the embodiments of the present disclosure are only for illustrative purposes and are not intended to limit the scope of such messages or information.

Optional features and examples are provided in each of the multiple embodiments described below. Multiple features described in the embodiments can be combined to form multiple optional solutions. Each numbered embodiment should not be regarded as only one solution. If not conflicted, the embodiments of the present disclosure and the features thereof may be combined with each other.

Embodiment One

Figure 1:
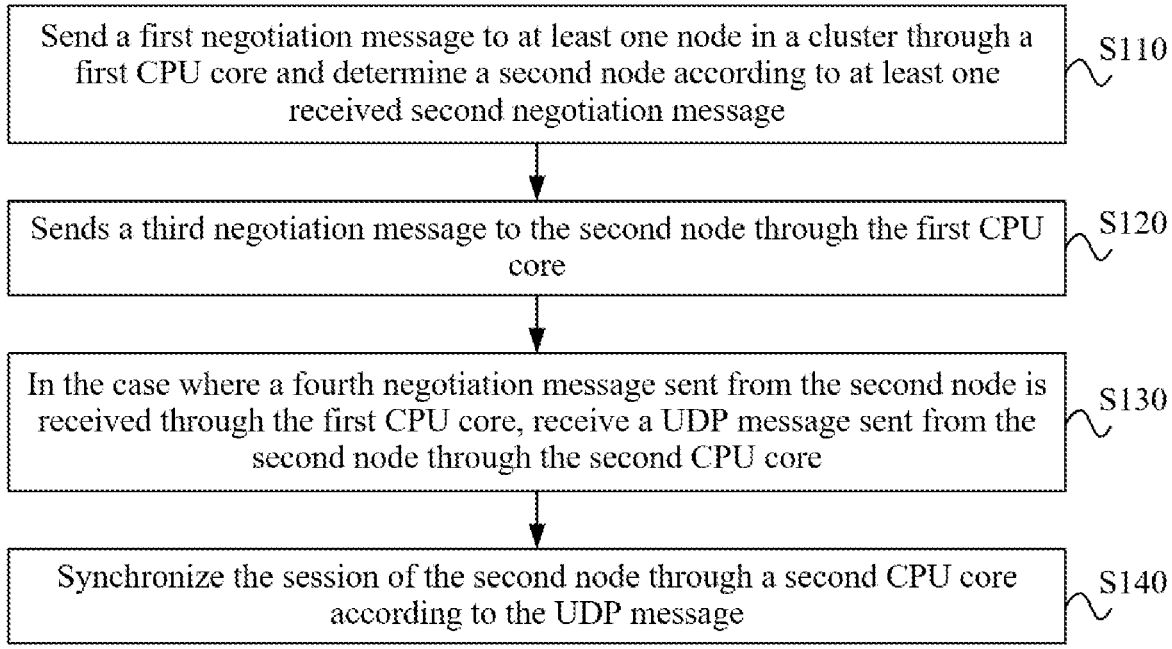
FIG. 1 is a flowchart of a session synchronization method according to embodiment one of the present disclosure.

FIG. 1 is a flowchart of a session synchronization method according to embodiment one of the present disclosure. The method is applicable to the case of session synchronization in a load balance cluster, for example, the method is applicable to the case where the cold synchronization of a session between different nodes of a four-layer load balancer cluster is performed in a unicast manner. The method may be executed by a session synchronization apparatus. The apparatus may be implemented in a form of software and/or hardware and integrated on a node in the load balance cluster. The node includes, but is not limited to, an access gateway or a load balancer.

Figure 2:
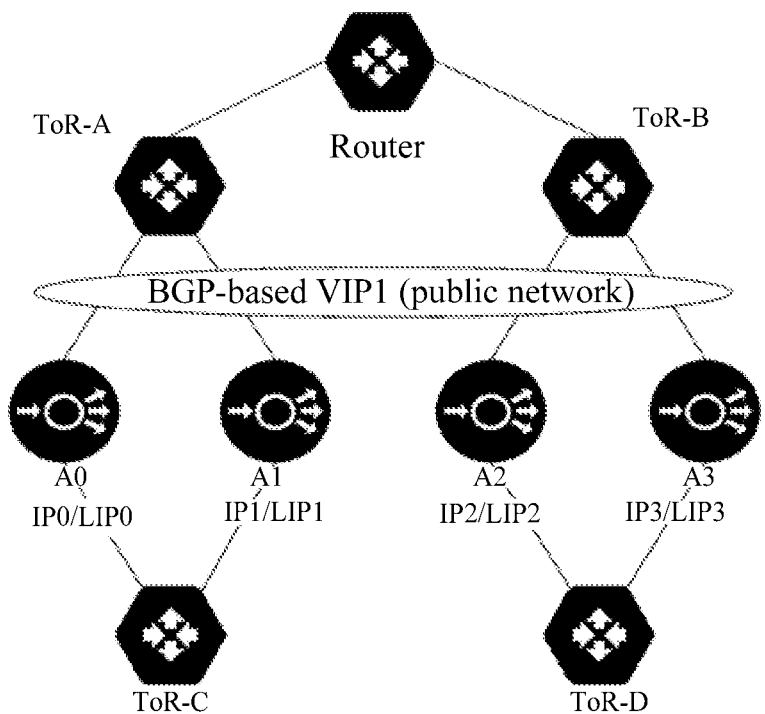
FIG. 2 is a diagram of a load balance cluster according to embodiment one of the present disclosure.

FIG. 2 is a diagram of a load balance cluster according to embodiment one of the present disclosure. A four-layer load balancer is used as the entry of four-layer access and deployed in a ToR in a cluster manner. In view of high availability (HA), one cluster may be deployed under each ToR. As shown in FIG. 2, a node A0 and a node A1 constitute a cluster A and are deployed under ToR-A. A Node B0 and a node B1 constitute a cluster B and are deployed under ToR-B. In practical applications, a cluster typically includes at least two nodes. In addition, the same virtual Internet protocol (VIP) based on the border gateway protocol (BGP) is deployed on the cluster A and the cluster B across a ToR, that is, the nodes A0, A1, B0, and B1 are all deployed in the same VIP. A local Internet protocol (LIP) address of a load balancer is allocated to each node at the local network side, and the LIP may be dedicated to the message transmission of a session establishment and a session close and may be dedicated to the transmission of a negotiation message. For example, LIP0 is allocated to the node A0, and LIP1 is allocated to the node A1. The cluster A and the cluster B constitute a cluster across ToR, and are mounted to the same service server cluster.

In FIG. 2, if all sessions on the node A0 are synchronized to each other node, and when the node A0 is restarted after power failure, the node A0 may receive session establishment messages from further nodes in a hot synchronization manner, but it cannot be ensured that all sessions before the power failure of the node A0 are completely restored. The hot synchronization process is described below.

1) The main sessions on the node A0 are sessions S1, S2, S3, and S4, and all four sessions are synchronized to further nodes.
2) After the node A0 is down, the service traffic of the sessions S1, S2, S3, and S4 is taken over by further nodes.
3) The node A1 receives the service traffic of the session S1, upgrades the session S1 to a main session S1, and synchronizes the main session S1 to further nodes at a fixed time.
4) After the node A0 is restored, the main session S1 synchronized by the node A1 at a fixed time is received by the node A0, and the node A0 establishes a slave session S1.
5) It is assumed that after 10 minutes, the node A0 announces to be online and receives the service traffic from a client again. After the slave session S1 is hit by the service traffic, the slave session S1 is upgraded to a main session S1. The node A0 may synchronize the main session S1 to further nodes at a fixed time. After the synchronization, the main session S1 on the node A1 is degraded to a slave session S1.

However, in the preceding process, if the session S1 is a long connection session, and after the node A0 is down, there is no continuous service traffic passing through for the session S1, and in this case, the session S1 is kept as a slave session S1 on the nodes A1, B0, and B1, and due to hot synchronization is not performed on the slave session between the nodes, after the node A0 announces to be online, none of the nodes A1, B0, and B1 would synchronize the slave session S1 to the node A0, and the node A0 needs to reestablish a connection to the client. That is, the session recovery on the node A0 is passive, and depends entirely on whether the client keeps sending service traffic. As a result, the integrity and synchronization efficiency of session synchronization cannot be ensured.

The method of this embodiment can solve the preceding problems by introducing a cold synchronization mechanism.

In this embodiment, a first CPU core refers to a HA core (HC) of a first node, for example, the HC of the node A0 in FIG. 2. A second CPU core refers to a worker core (WC) of the first node, for example, the WC of the node A0 in FIG. 2. A third CPU core refers to the HC of a second node, for example, the HC of the node A1, B0 or B1 in FIG. 2. A fourth CPU core refers to the WC of the second node, for example, the WC of the node A1, B0 or B1 in FIG. 2.

As shown in FIG. 1, a session synchronization method provided in embodiment one of the present disclosure may be applied to the first node, that is, a node that needs to synchronize sessions of further nodes, or that may be understood as a failure node. The session synchronization method includes below operations S110-S140.

In S110, a first negotiation message to at least one node in a cluster is sent through a first CPU core, and the second node is determined according to at least one received second negotiation message.

In this embodiment, the first CPU core is a CPU core in the first node and responsible for performing hot synchronization on the HA message of this node to further nodes and may also be referred to as an HC. The first negotiation message may be understood as a UDP message that initiates a cold synchronization negotiation. The first negotiation message is sent through the first CPU core to each of further nodes in the cluster, to query one or more nodes in the cluster and select one node from the further nodes and use the node as the peer node for cold synchronization. Each of the nodes in the cluster may return the second negotiation message to the first node after receiving the first negotiation message. The first node determines the second node according to the at least one received second negotiation message and enters a cold synchronization flow with the second node. The second negotiation message may be understood as a UDP message agreeing to perform a cold synchronization negotiation with the first node. The second node sends the second negotiation message to the first node to notify that the first node is discovered, or that cold synchronization is supported, or that a connection to the first node is agreed to establish to perform session synchronization, or the like.

For example, the first node may use a sending node of the first one of the at least one received second negotiation message as the second node or may determine the second node according to the information indicated in the one or more received second negotiation messages. There may be one or more second nodes. In the present disclosure, description is given by using an example of a session synchronization process between the first node and one second node.

In S120, a third negotiation message to the second node is sent through the first CPU core.

In this embodiment, after the first node determines the second node, the third negotiation message is sent through the first CPU core to the second node. The third negotiation message may be understood as a UDP message for cold synchronization negotiation in a one-to-one manner with the second node, before the cold synchronization starts, to request to establish a connection to the second node, so that the second node is ready for cold synchronization.

In S130, in the case where a fourth negotiation message sent from the second node is received through the first CPU core, the UDP message sent from the second node is received through the second CPU core.

In this embodiment, the fourth negotiation message may be understood as a UDP message for cold synchronization negotiation in a one-to-one manner with the first node before cold synchronization starts. After the second node receives the third negotiation message, the second node agrees to establish a connection to the first node and may send the fourth negotiation message to the first node.

When the fourth negotiation message is received by the first CPU core, a connection to the second node is established, and session synchronization may be started. The second node encapsulates all the sessions (including a main session and a slave session) on the second node in the UDP message and sends the UDP messages to the first node in batches at a fixed time. The first node receives the UDP message through the second CPU core and synchronizes the sessions according to the UDP message.

The first node includes one or more second CPU cores which are responsible for processing service messages and HA messages from further nodes by cold synchronization and may also be referred to as WCs. There are one second CPU core or multiple second CPU cores. If there are multiple second CPU cores, each second CPU core may be configured to receive a corresponding UDP message according to a message filtering rule and synchronize a corresponding session, so that the UDP message may be directly delivered to a corresponding second CPU core, and the forwarding of a same message among different CPU cores in the same node is reduced.

In S140, the session of the second node is synchronized through the second CPU core according to the UDP message.

In this embodiment, the establishment messages and/or close messages of all the sessions of the second node are encapsulated in the UDP message, and all the sessions of the second node are synchronized through the second CPU core accordingly. Hot synchronization between the second node and each further node in the cluster is possible, that is, each node synchronizes the main session of each node to further nodes at a fixed time. Thus, the second node not only has the master session of the second node, but also slave sessions of further nodes. Through a cold synchronization negotiation and the transmission of the UDP message, even if the service traffic of the client is not continuously sent, or even for the slave sessions of further nodes, the first node may restore completely according to the UDP message sent from the second node and does not need to reestablish a connection to the client, thereby ensuring the integrity and synchronization efficiency of the session synchronization.

If there are multiple second CPU cores, each second CPU core may synchronize a corresponding session according to a corresponding UDP message. For example, WC1 of the first node may receive a UDP message in which all sessions of WC1 of the second node are encapsulated, thereby implementing cold session synchronization with WC1 of the second node. WC2 of the first node may receive a UDP message in which all sessions of WC2 of the second node are encapsulated, thereby implementing cold session synchronization with WC2 of the second node.

In the preceding technical solutions, by using the first CPU core to negotiate with the second node, and using the second CPU core to synchronize the session of the second node, even when the service traffic of the client is not continuous, all the sessions of the second node may be synchronized, and no connection to the client needs to be reestablished, thereby ensuring the integrity of session synchronization, and improving synchronization efficiency.

In a session synchronization method provided in this embodiment, a cold synchronization mechanism is introduced to support the cold synchronization of all sessions between any two nodes in the cluster. Even when the service traffic of the client is not continuous, all the sessions of the second node may be synchronized, and a connection to the client does not need to be reestablished, thereby ensuring the integrity of session synchronization and improving synchronization efficiency. In addition, unicast is used in the cold synchronization negotiation process, that is, each node performs session synchronization using an independent CPU core and does not need a switch, which is applicable to a classic network and a virtual network and has wide applicability.

Embodiment Two

Figure 3:
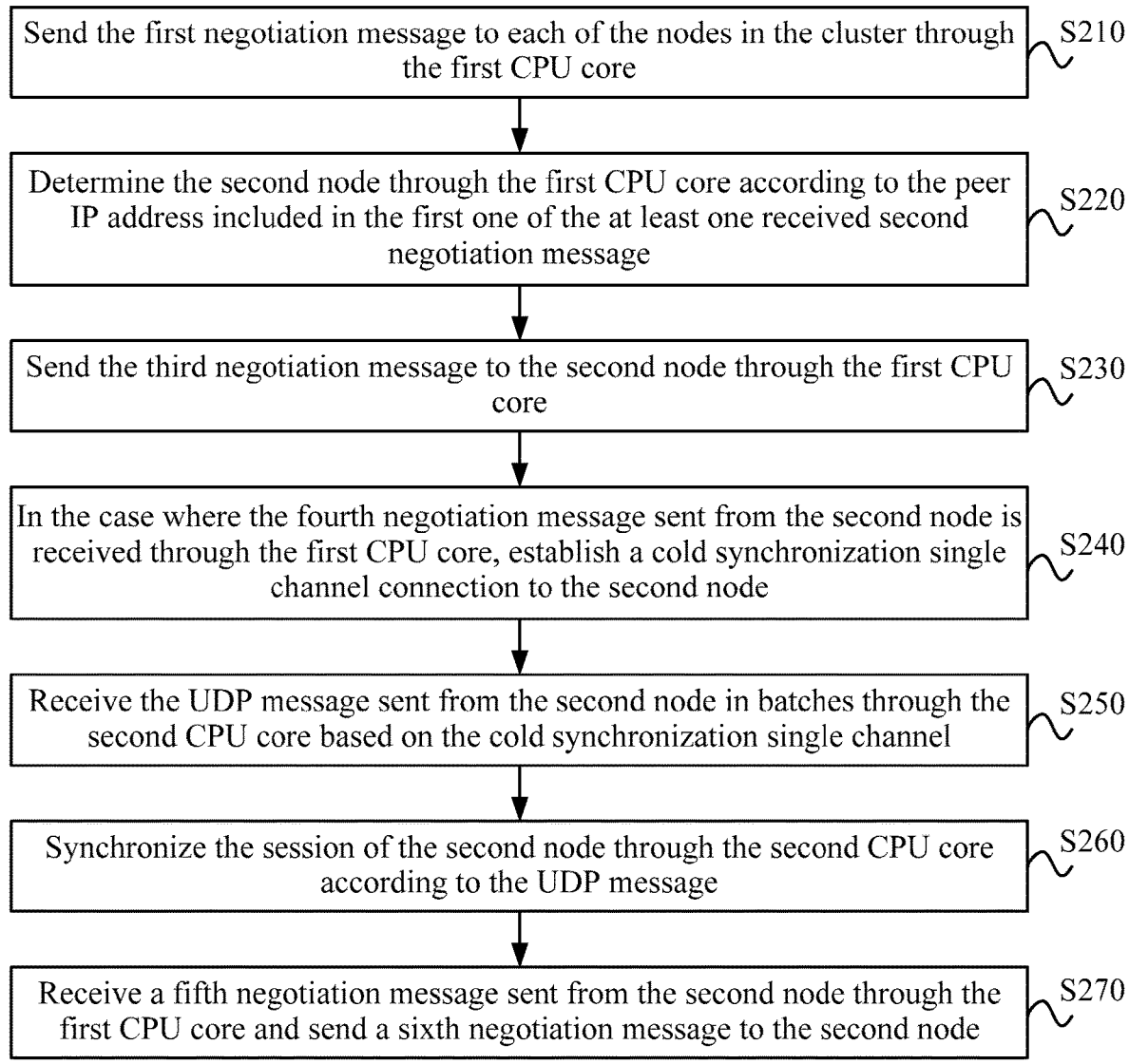
FIG. 3 is a flowchart of a session synchronization method according to embodiment two of the present disclosure.

FIG. 3 is a flowchart of a session synchronization method according to embodiment two of the present disclosure. Based on embodiment one, embodiment two describes the cold synchronization negotiation process and the cold synchronization state machine of a node.

In this embodiment, determining the second node according to the at least one received second negotiation message includes: determining the second node through the first CPU core according to the peer Internet protocol (IP) address included in the first one of the at least one received second negotiation message. On this basis, the second node may be accurately and efficiently determined, and the cold synchronization negotiation time may be shortened.

In this embodiment, in the case where the fourth negotiation message sent from the second node is received through the first CPU core, receiving the UDP message sent from the second node through the second CPU core includes: in the case where the fourth negotiation message sent from the second node is received through the first CPU core, establishing a cold synchronization single channel connection to the second node; and receiving the UDP message sent from the second node through the second CPU core in batches based on the cold synchronization single channel. The UDP message includes the session establishment message of the main session and/or the establishment session establishment message of the slave session of the second node. On this basis, the first node establishes a single channel connection to the second node based on the UDP. A node may transmit a message with the best effort, without a sequence number or an acknowledgement number, which does not depend on a switch, and is applicable to a classic network and a virtual network.

In this embodiment, after the session of the second node is synchronized according to the UDP message, the method also includes receiving a fifth negotiation message sent from the second node through the first CPU core and sending a sixth negotiation message to the second node through the first CPU core. On this basis, the number of sessions synchronized between the first node and the second node may be determined, and the integrity of session synchronization may be ensured.

For the content not detailed in this embodiment, reference may be made to embodiment one.

As shown in FIG. 3, a session synchronization method provided in embodiment two of the present disclosure includes the below operations S210-S270.

In S210, the first negotiation message is sent through the first CPU core to each of the nodes in the cluster.

In S220, the second node is determined through the first CPU core according to the peer IP address included in the first one of the at least one received second negotiation message.

In this embodiment, the second negotiation message includes the IP address of the sender node. The first CPU core uses the sending node of the first one of the at least one received second negotiation message as the second node, thereby shortening the cold synchronization negotiation time and improving the cold synchronization efficiency.

In S230, the third negotiation message is sent through the first CPU core to the second node.

In S240, in the case where the fourth negotiation message sent from the second node is received through the first CPU core, the cold synchronization single channel connection to the second node is established.

In S250, the UDP message sent from the second node is received through the second CPU core in batches based on the cold synchronization single channel.

In this embodiment, the UDP message includes the session establishment message of the main session and/or the session establishment message of the slave session of the second node. These session establishment messages are encapsulated in batches and periodically sent to the second CPU core of the first node through the UDP message at a fixed time.

In an embodiment, the method also includes refreshing the cold synchronization negotiation state machine of the first node through the second CPU core each time a session establishment message in the UDP message is received.

In this embodiment, when each time the session establishment message in the UDP message is received through the second CPU core, the cold synchronization negotiation state machine of the first node is refreshed through the second CPU core to determine whether the first node is in the process of session cold synchronization until each UDP message has been received, and the cold synchronization negotiation state machine enters the next state.

In S260, the session of the second node is synchronized through the second CPU core according to the UDP message.

In S270, the fifth negotiation message sent from the second node is received through the first CPU core and the sixth negotiation message is sent to the second node.

In this embodiment, the fifth negotiation message and the sixth negotiation message may be understood as UDP messages for cold synchronization negotiation in a one-to-one manner between nodes after the cold synchronization is completed. The second node sends the fifth negotiation message to the first node after sending the UDP message to notify the first node that cold synchronization is completed. After through the first CPU core, the fifth negotiation message is received, the sixth negotiation message is sent to the second node. In this manner, the first node and the second node complete the cold synchronization and mutually determine all synchronized sessions.

Figure 4:
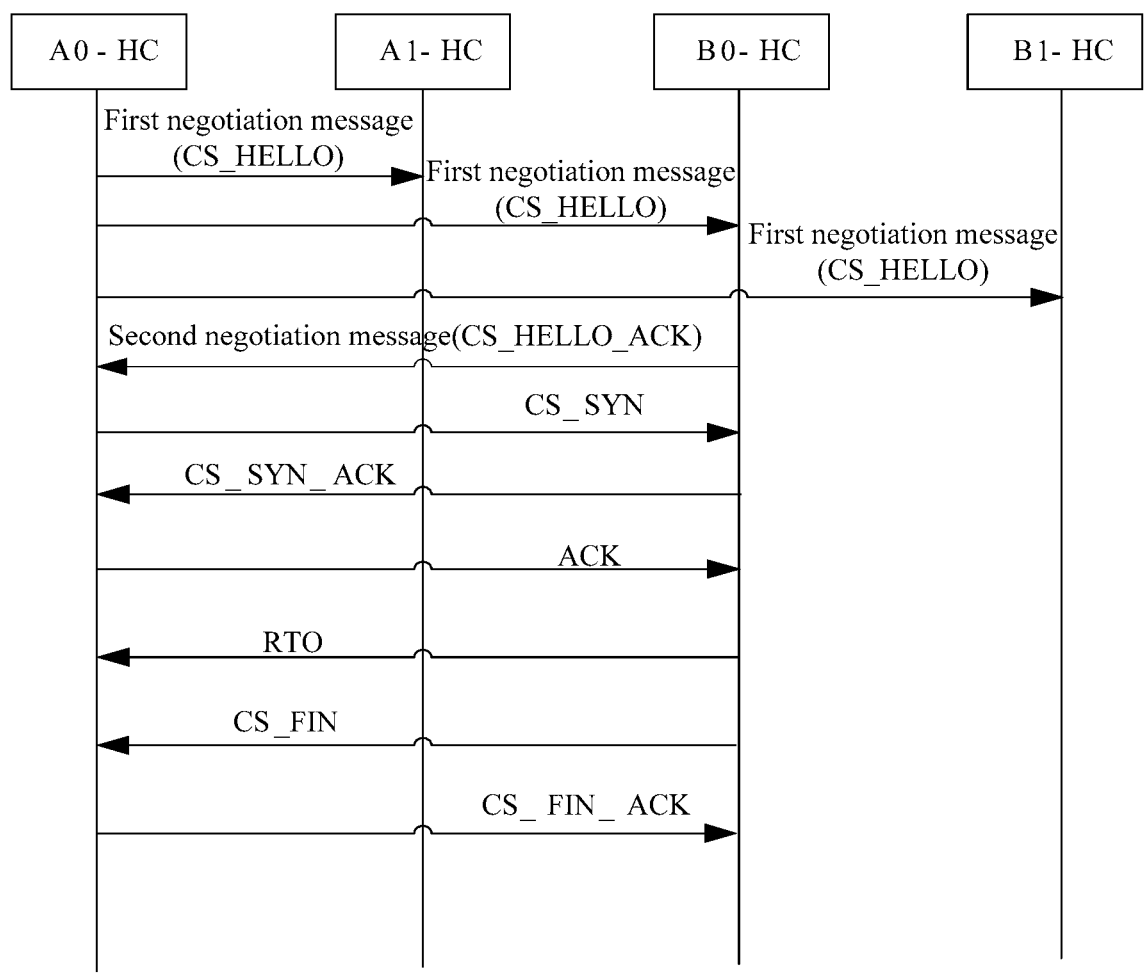
FIG. 4 is a diagram of a cold synchronization negotiation process according to embodiment two of the present disclosure.

FIG. 4 is a diagram of a cold synchronization negotiation process according to embodiment two of the present disclosure. As shown in FIG. 4, the first node is the node A0. The cold synchronization negotiation process includes the operations below.

After each node is initialized or restarted, each node is in a listening (CS_LISTEN) state. A node in the CS_LISTEN state may respond to first negotiation messages from further nodes. A node in a non-CS_LISTEN state may directly ignore the first negotiation message even if the node receives the first negotiation message.

After the node A0 is online, a command for starting cold synchronization is executed. The first CPU core of the node A0 (denoted as A0-HC) sends the first negotiation message (that is, the message CS_HELLO) to the HCs of all further nodes and determines the second node according to the peer IP included in the second negotiation message (that is, the message CS_HELLO_ACK) which is received first. It is assumed that the second node is the node B0, the node A0 performs cold synchronization interaction with the node B0.

A0-HC sends the third negotiation message (that is, the message CS_SYN) to the HC of the node B0 (denoted as B0-HC). B0-HC receives the message and sends the fourth negotiation message (that is, the message CS_SYN_ACK) to A0-HC.

After A0-HC receives the fourth negotiation message, A0-HC may send an acknowledgement (ACK) message to B0-HC to acknowledge establishment of a single channel connection and may start cold synchronization.

During session cold synchronization, each WC of the node B0 (denoted as B0-WCx, x=1, 2, . . . , and n, where n is the total number of WCs in the node A0 or the node B0) respectively starts a cold synchronization timer, uses the main session and slave session of each WC as running time objects (RTO), encapsulates them in a UDP message in batches, and sends them to corresponding A0-WCx in the node A0 through the B0-HC. The corresponding A0-WCx establishes a session corresponding to B0-WCx according to the received UDP message and determines the session as a slave session of A0-WCx. The UDP message may be sent in batches at a fixed time until all sessions of each WC of the node B0 are sent. Each WC of the node B0 stops the cold synchronization timer and notifies B0-HC that the cold synchronization ends.

After the node B0-HC is notified that each WC of the node B0 have sent the session of each WC, the node B0-HC sends the fifth negotiation message (that is, the message CS_FIN) to the node A0-HC.

After A0-HC receives the message CS_FIN, A0-HC sends the sixth negotiation message (that is, the message CS_FIN_ACK) to B0-HC. In this manner, the node A0 completes cold synchronization, and then the node A0 announces to be online and starts to receive and process the service message of the client. If a slave session is hit by the service message, the slave session may be upgraded to the main session.

In the preceding process, the node A0 may be regarded as a cold synchronization client (CS_CLIENT), and the node B0 may be regarded as a cold synchronization server (CS_SERVER). A0-HC may be regarded as a cold synchronization negotiation client, and B0-HC may be regarded as a cold synchronization negotiation server.

Figure 5:
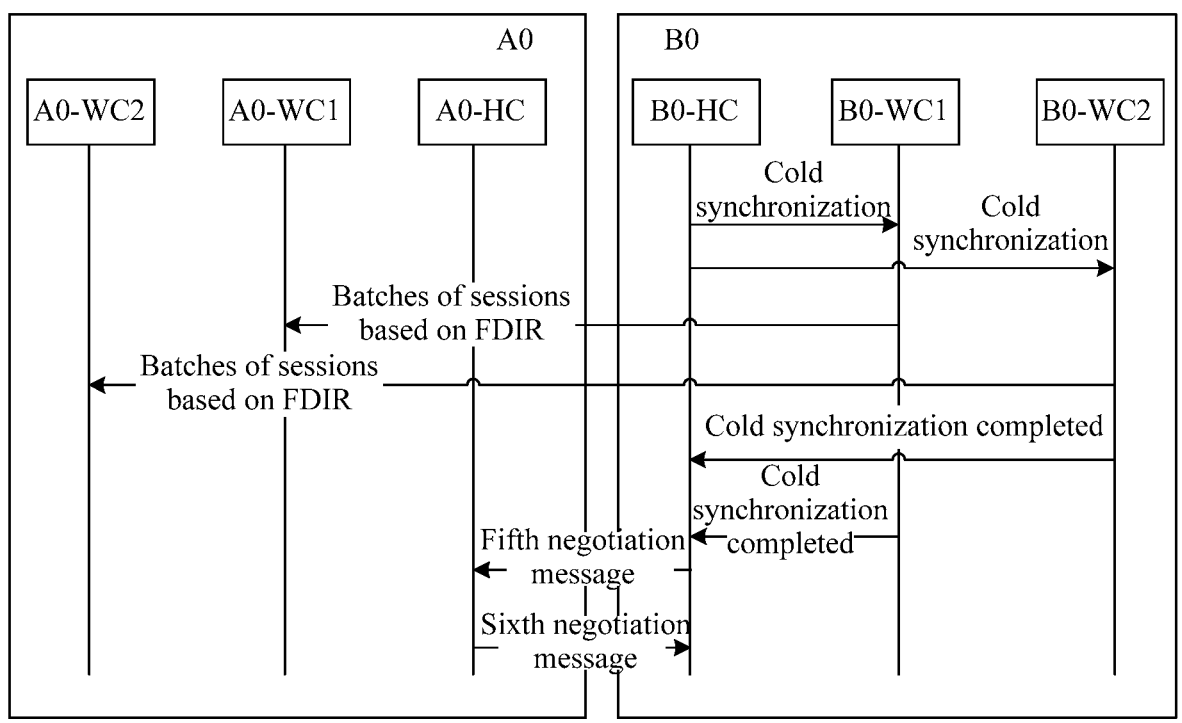
FIG. 5 is a diagram of a cold synchronization process according to embodiment two of the present disclosure.

FIG. 5 is a diagram of a cold synchronization process according to embodiment two of the present disclosure. As shown in FIG. 5, the first node is the node A0, and the second node is the node B0. The session cold synchronization process includes the operations below.

After B0-HC receives the ACK new message from the node A0, B0-HC notifies each WC (using two WCs, B0-WC1 and B0-WC2, as an example) to perform cold synchronization.

B0-WC1 and B0-WC2 send their sessions to corresponding A0-WC1 and A0-WC2 in the node A0 based on a message filtering rule (for example, flow director (FDIR)).

After the sessions of B0-WC1 and B0-WC2 are sent, B0-WC1 and B0-WC2 notify B0-HC that the cold synchronization is completed. B0-HC may send the fifth negotiation message to A0-HC and receive the sixth negotiation message from A0-HC.

Figure 6:
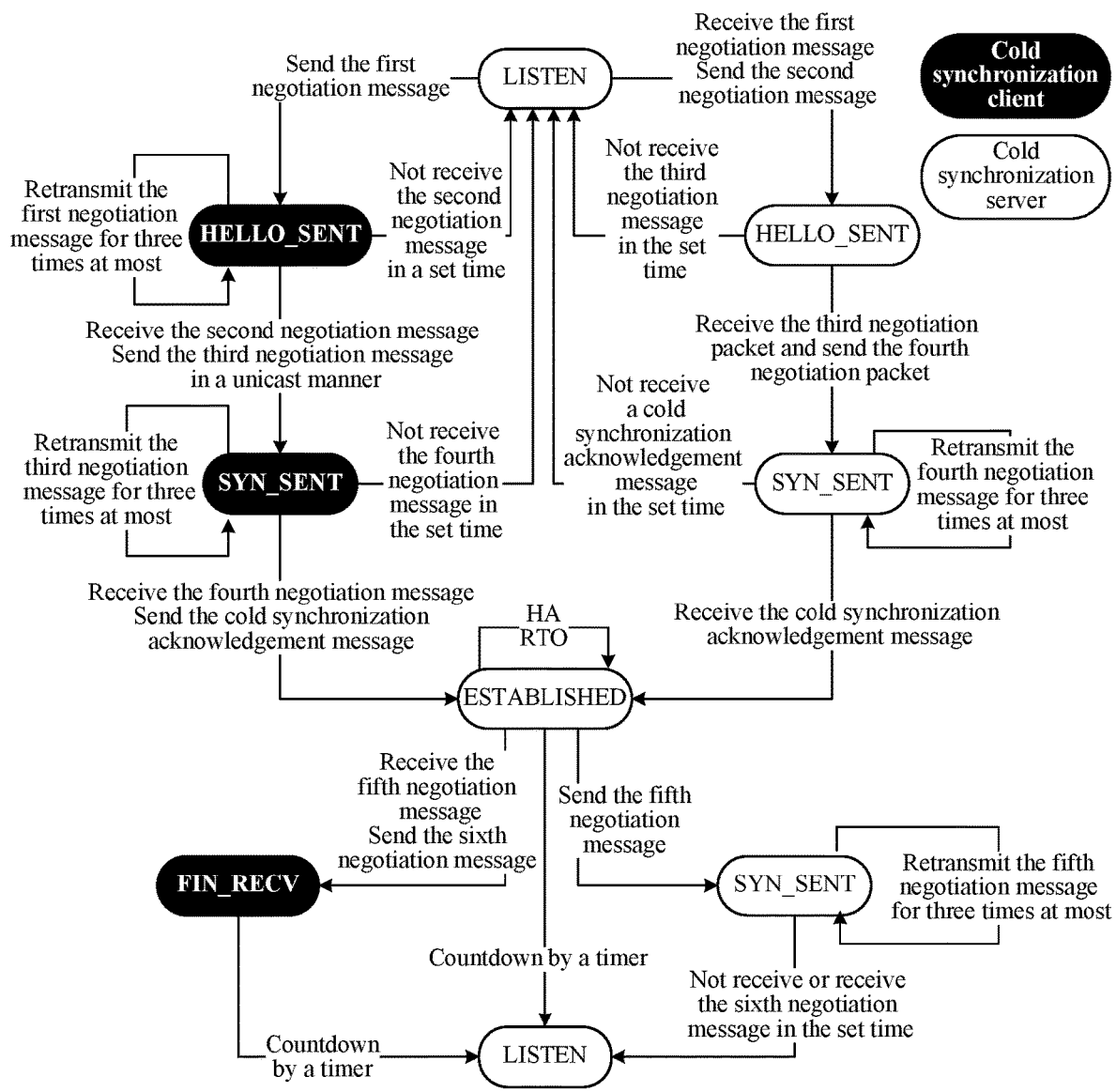
FIG. 6 is a flowchart of a cold synchronization negotiation state machine according to embodiment two of the present disclosure.

FIG. 6 is a flowchart of a cold synchronization negotiation state machine according to embodiment two of the present disclosure. As shown in FIG. 6, the explanation of the cold synchronization state machine is below by using an example in which the node A0 is used as the client for cold synchronization, and the node B0 is used as the server for cold synchronization.

The node A0 and the node B0 are initialized and are in a listening (CS_LISTEN) state.

The node A0, as a cold synchronization client, is in a first negotiation message sending (HELLO_SENT) state after the node A0 is online, that is, the message CS_HELLO is sent to all further nodes in the cluster until message CS_HELLO_ACK is received from one node. The node A0 tries to send message CS_HELLO for three times at most, at an interval of a first duration (for example, one second). If for all the three times, no node responds to message CS_HELLO, cold synchronization is ended.

The node A0 first receives the message CS_HELLO_ACK sent by the node B0 and then enters a third negotiation message sending (SYN SENT) state, that is, the message CS_SYN is sent to the node B0. The node A0 tries to send the message CS_SYN to the node B0 for three times at most at an interval of one second. If the message CS_SYN_ACK sent from the node B0 is not received for any of the three times, cold synchronization is ended.

The node B0 enters a first negotiation message receiving (HELLO_RECV) state from the LISTEN state. After the node B0 receives the message CS_HELLO of the node A0, the node B0 sends message CS_HELLO_ACK to the node B0 and then enters a third negotiation message receiving (SYN_RECV) state.

After the node B0 receives the message CS_SYN from the node A0, the node B0 sends the message CS_SYN_ACK to the node A0. The node B0 retries to send the message CS_SYN_ACK for three times at most. If no ACK message sent from the node A0 is received for any of the three times, cold synchronization is ended.

After the node A0 receives the message CS_SYN_ACK sent from the node B0, the node A0 enters a connection (ESTABLISHED) state. After the node B0 receives the ACK message sent from the node A0, the node B0 also enters the ESTABLISHED state. On this basis, the node A0 and the node B0 start session cold synchronization (referring to FIG. 5 for the cold synchronization process). The node A0 or the node B0 refreshes ESTABLISHED state of their respective cold synchronization negotiation state machine each time a session establishment message is sent or received through the UDP message.

After each WC in the node B0 performs cold synchronization on all sessions, the node B0 enters a fifth negotiation message sending (FIN SENT) state and sends the message CS_FIN to A0-HC through B0-HC. The node B0 tries to send the message CS_FIN to the node A0 for three times at most at an interval of one second. If the message CS_FIN_ACK is not received for any of the three times, cold synchronization is directly ended.

The node A0 receives the session of each WC in the node B0 and then enters a fifth negotiation message receiving (FIN_RECV) state, receives the message CS_FIN through A0-HC, and returns the message CS_FIN_ACK to A0-HC. At this time, cold synchronization is ended.

In a session synchronization method provided in embodiment two of the present disclosure, the first CPU core uses the sending node of the first one of the at least one received second negotiation message as the second node, thereby shortening the cold synchronization negotiation time and improving the cold synchronization efficiency. The first node establishes the single channel connection based on the UDP to the second node. A node may transmit a message with the best effort, without a sequence number or an acknowledgement number, and does not need a switch, which is applicable to a classic network and a virtual network. The fifth negotiation message and the sixth negotiation message are exchanged to determine the number of sessions to be synchronized, and a cold synchronization negotiation state machine is combined to improve the reliability of session cold synchronization.

Embodiment Three

Figure 7:
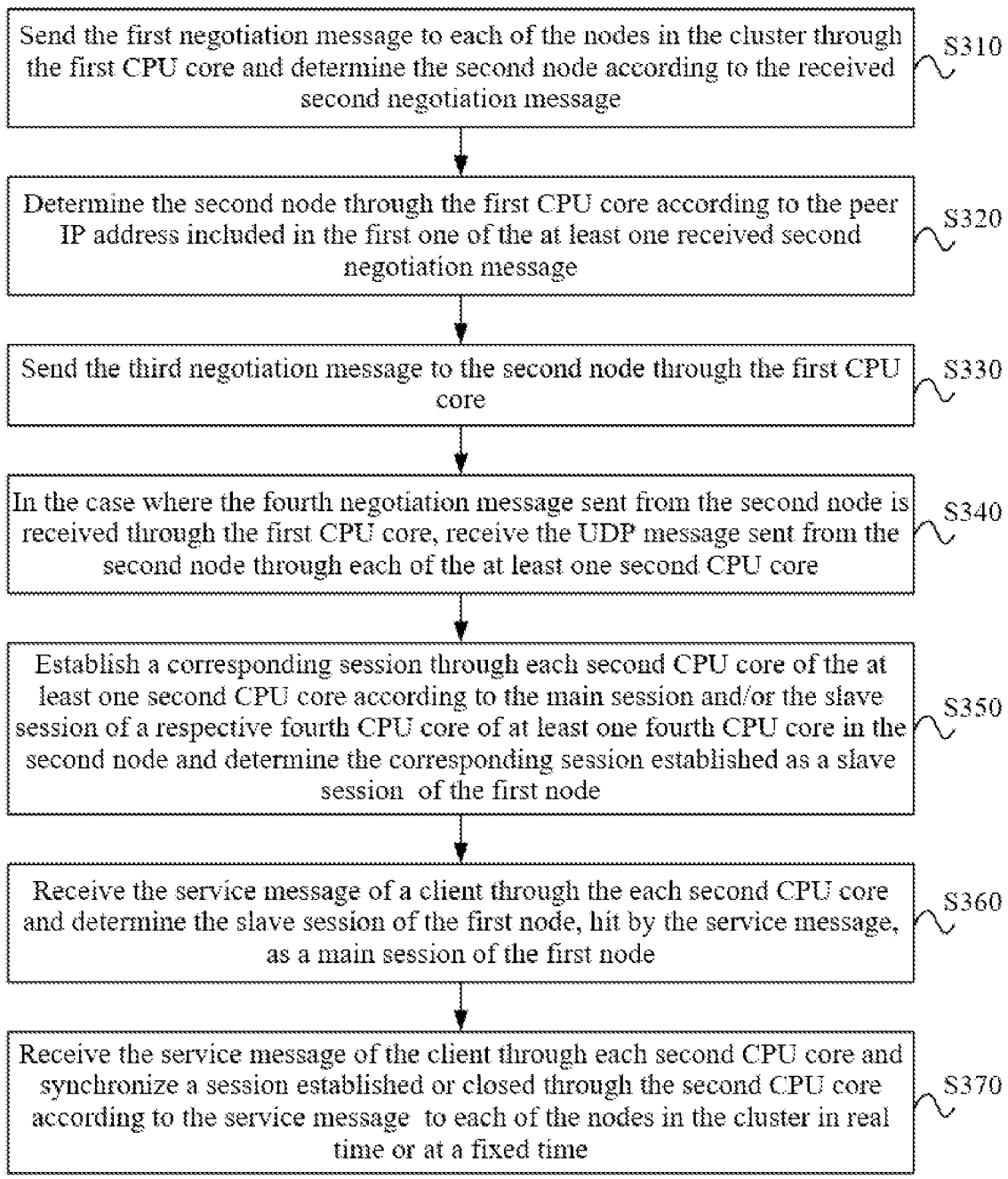
FIG. 7 is a flowchart of a session synchronization method according to embodiment three of the present disclosure.

FIG. 7 is a flowchart of a session synchronization method according to embodiment three of the present disclosure. Based on the preceding embodiments, in embodiment three, the corresponding synchronization process between WCs of different nodes is described.

In this embodiment, the first communication node comprises at least one second CPU core. The UDP message encapsulates a main session and/or a slave session of each fourth CPU core in the second node. Synchronizing the session of the second node through the second CPU core according to the UDP message includes: establishing through each second CPU core a corresponding session according to a main session and/or a slave session of a respective fourth CPU core of at least one fourth CPU core in the second node, and determining the corresponding session established as a slave session of each second CPU core. The forwarding of UDP messages among different WCs in a node is avoided through the corresponding synchronization between each WC of the first node and a respective WC of the second node, so that an HA performance is improved.

In this embodiment, after the session of the second node is synchronized according to the UDP message, the method also includes receiving the service message of the client through each second CPU core of the at least one second CPU core and determining a slave session of the first node, hit by the service message, as a main session of the first node. In this way, a long connection session may be upgraded from a slave session to a main session in real time according to service traffic, to effectively manage the session and provide a basis for hot synchronization.

In this embodiment, the method also includes receiving the service message of the client through the second CPU core and synchronizing a session established or closed through the second CPU core to each of the nodes in the cluster in real time or at a fixed time according to the service message. On the basis of session cold synchronization, combined with hot synchronization, the reliability and flexibility of session synchronization are improved.

In this embodiment, the first CPU core refers to the HC of the first node. The second CPU core refers to the WC of the first node. The third CPU core refers to the HC of the second node. The fourth CPU core refers to the WC of the second node.

For the content not detailed in this embodiment, reference may be made to the preceding embodiments.

As shown in FIG. 7, a session synchronization method provided in embodiment three of the present disclosure includes the operations S310-S370 below.

In S310, through the first CPU core, the first negotiation message is sent to each of the nodes in the cluster, and the second node is determined according to the received second negotiation message.

In S320, the second node is determined through the first CPU core according to the peer IP address included in the first one of the at least one received second negotiation message.

In S330, the third negotiation message is sent through the first CPU core to the second node.

In S340, in the case where the fourth negotiation message sent from the second node is received through the first CPU core, the UDP message sent from the second node is received through each second CPU core.

In this embodiment, that each second CPU core of the first node may receive the UDP message from the respective fourth CPU core in the second node and synchronize the corresponding session includes that: A0-WCx receives the UDP message from B0-WCx. The forwarding of UDP messages among different WCs in a node is avoided through the corresponding synchronization between each WC of the first node and a respective WC of the second node, so that the HA performance is improved.

In S350, through each second CPU core, a corresponding session is established according to a main session and/or a slave session of a respective fourth CPU core of at least one fourth CPU core in the second node, and the corresponding session established is determined as a slave session of the first node.

In S360, through each second CPU core, the service message of the client is received, and the slave session of the first node, hit by the service message, is determined as a main session of the first node.

In this embodiment, in the case where the session synchronized according to the UDP message is determined as a slave session of each second CPU core of the first node and where the slave session is hit by the received service traffic of the client, the slave session is upgraded to a main session. For a long connection session, it may be upgraded from a slave session to a main session in real time according to service traffic, to effectively manage the session and provide a basis for hot synchronization.

In S370, through each second CPU core, the service message of the client is received, and the session established or closed through the second CPU core is synchronized to each of the nodes in the cluster in real time or at a fixed time according to the service message.

In this embodiment, for a main session, hot synchronization may also be combined, that is, the first node synchronizes the main session to further nodes in real time or at a fixed time according to service traffic through the first CPU core. On the basis of session cold synchronization, combined with hot synchronization, the reliability and flexibility of session synchronization are improved.

In an embodiment, the method also includes allocating a corresponding port to the first CPU core and a corresponding port to the second CPU core and configuring a triplet message filtering rule for the first CPU core and a triplet message filtering rule for the second CPU core through a network card.

In this embodiment, by configuring the data plane development kit (DPDK) message filtering rule on the network card, the network card supports to directly forward the UDP message to a network card queue corresponding to the HC or WC. Herein, the DPDK is an Intel X86 platform, operated based on Linux, and is a function library and a driver set used for fast data packet processing. The first node allocates a fixed port for the HC of the first node and for each WC of the first node, and configures a triplet FDIR for the HC and each WC on the network card. For example, A0-HC corresponds to an FDIR rule (UDP, LIP0, LPORT0), and B0-WC1 corresponds to a rule (UDP, LIP2, LPORT1).

Further, the second node also configures a DPDK FDIR on the network card for the HC of the second node and each WC of the second node to receive HA messages corresponding to the HC and each WC of further nodes. On this basis, the first CPU core is configured with an FDIR (UDP, LIP0, LPORT0). The second CPU core is configured with an FDIR (UDP, LIP0, LPORT1). The third CPU core is configured with an FDIR (UDP, LIP1, LPORT0). The fourth CPU core is configured with an FDIR (UDP, LIP1, LPORT1). The messages transmitted between the first CPU core and the third CPU core is a quintuplet of (UDP, LIP0/SRC_PROT1, LIP1/LPORT0), where UDP, LIP1, and LPOR0 are associated with the FDIR configured for the HC of the second node and used for indicating the transmission relationship of UDP message between two nodes. The method in this embodiment is applicable to the configuration of the Internet Protocol version 4 (IPv4) rule and the Internet Protocol version 6 (IPv6) rule and is applicable to mainstream network cards, such as an Mellanox Cx-4/5 network card and an Intel ixgbe/i40e network card.

In this embodiment, the HC of each node and each WC are allocated the same port number. The network card of the second node receives a cold synchronization negotiation message and matches a corresponding FDIR, and these may be directly sent to the HC or WC of this node, thereby improving the cold synchronization negotiation performance. The network card of the second node may also receive an HA message, that is, a session establishment message and a session close message, and match a corresponding FDIR, and these may be directly sent to the corresponding WC of this node, thereby improving the processing performance of the HA message. For example, multiple sessions established by A0-WC1 may be encapsulated in a UDP message. If there is no FDIR, the sessions may be distributed to WC2 or WC3 on the node B0, and then forwarded to WC1 via WC2 or WC3. As a result, the HA performance is affected. In the method in this embodiment, an FDIR is used for directly forwarding the UDP message of A0-WC1 to the network card queue associated with B0-WC1 through the network card of the node B0, and the UDP message is directly processed by B0-WC1, thereby improving the session synchronization efficiency.

Figure 8:
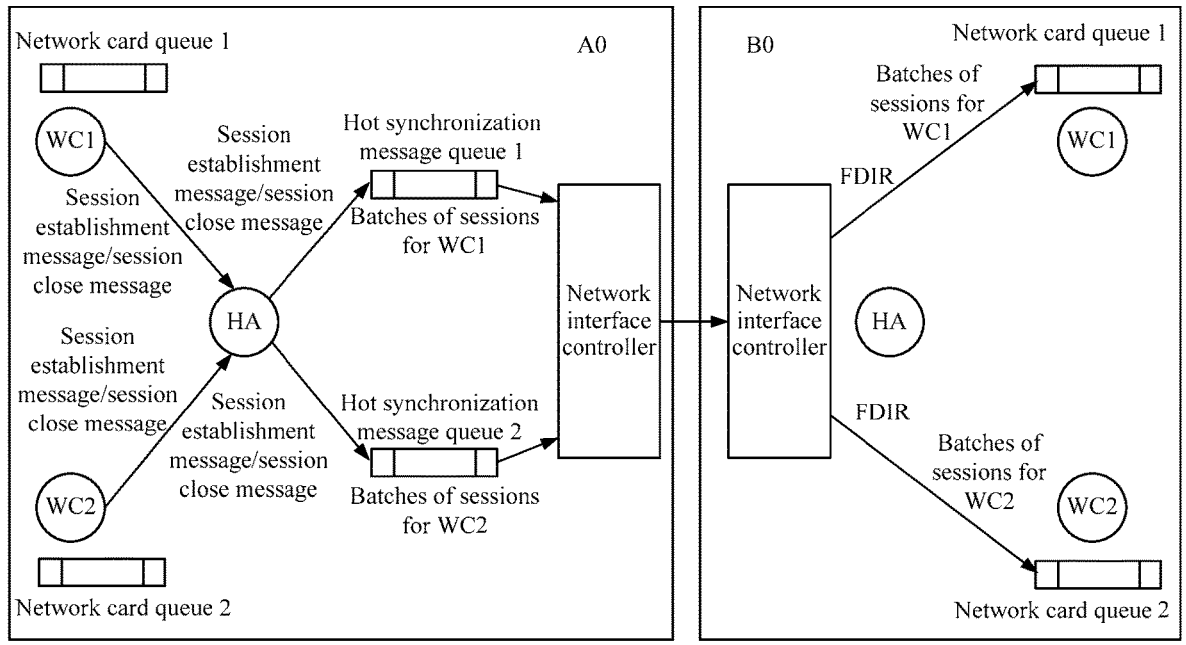
FIG. 8 is a diagram of the implementation of session synchronization according to embodiment three of the present disclosure.

FIG. 8 is a diagram of the implementation of session synchronization according to embodiment three of the present disclosure. As shown in FIG. 8, for a cold synchronization negotiation message (the first negotiation message to the sixth negotiation message described above), A0-HC sends the message CS_HELLO to B0-HC. The quintuplet of the message is (UDP, LIP0/SRC_PROT1, LIP1/LPORT0). SRC_PORT1 is a random value between [1024, 65535].

For a hot synchronization session establishment message, A0-HC performs hot synchronization on the hot synchronization session establishment message of the established session on A0-WC2 to B0-WC2. The quintuplet of the message is (UDP, LIP0/SRC_PORT2, LIP1/LPORT2).

SRC_PORT2 is a random value between [1024, 65535].

In addition, for a cold synchronization session establishment message, A0-WC3 performs cold synchronization on the main session and the slave session of A0-WC3 to the node B0-WC3. The quintuplet of the message is (UDP, LIP0/SRC_PORT3, LIP2/LPORT3). SRC_PORT3 is a random value between [1024, 65535].

The preceding three messages may be directly forwarded through the network card to the HC and the network card receiving queue corresponding to each WC.

In a session synchronization method provided in embodiment three of the present disclosure, the forwarding of UDP messages among different WCs in a node is avoided through the corresponding synchronization between each WC of the first node and a respective WC of the second node, so that the HA performance and synchronization efficiency are improved. For a long connection session, the session may be upgraded in real time according to service traffic to effectively manage the session and provide a basis for hot synchronization. On the basis of session cold synchronization, combined with hot synchronization, the reliability and flexibility of session synchronization are improved.

Embodiment Four

Figure 9:
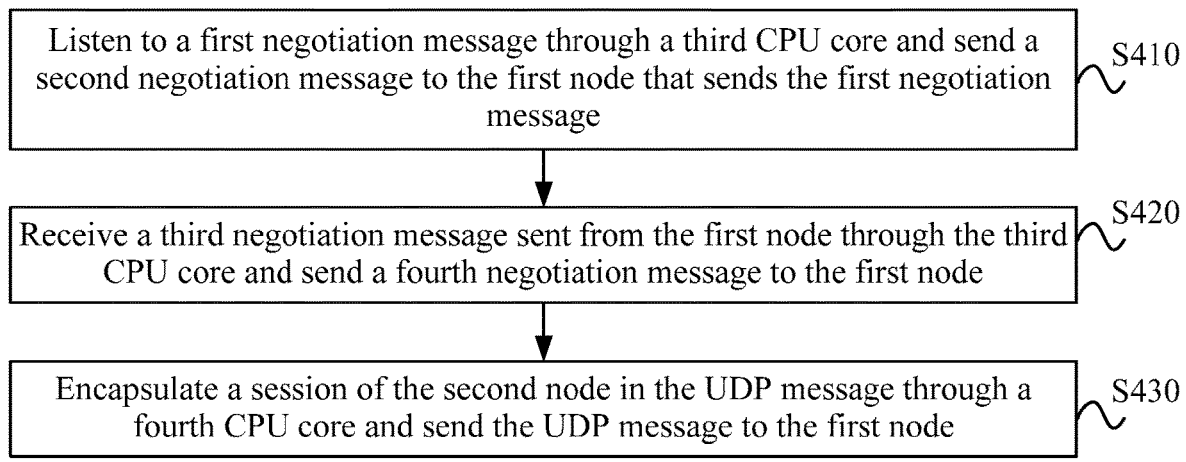
FIG. 9 is a flowchart of a session synchronization method according to embodiment four of the present disclosure.

FIG. 9 is a flowchart of a session synchronization method according to embodiment four of the present disclosure. The method is applicable to the case of session synchronization in the load balance cluster, for example, the case where the cold synchronization of a session between different nodes of the four-layer load balancer cluster is performed in a unicast manner. This method may be executed by the session synchronization apparatus. The apparatus may be implemented in a form of software and/or hardware and integrated on a second node in the load balance cluster. The node includes an access gateway or a load balancer.

For the content not detailed in this embodiment, reference may be made to the preceding embodiments.

As shown in FIG. 9, a session synchronization method provided in embodiment four of the present disclosure includes the operations S410-S430 below.

In S410, through the third CPU core, the first negotiation message is listened to, and the second negotiation message is sent to the first node which sends the first negotiation message.

In this embodiment, the second node may be a peer node at which the first node performs session cold synchronization, or may be a node in the cluster that firstly receives the first negotiation message, or a node that firstly sends the second negotiation message to the first node, or a node determined after negotiation with further nodes.

In S420, through the third CPU core, the third negotiation message sent from the first node is received, and the fourth negotiation message is sent to the first node.

In S430, through the fourth CPU core, the session of the second node is encapsulated in the UDP message, and the UDP message is sent to the first node.

In this embodiment, the second node encapsulates all the sessions (including a main session and a slave session) on the second node in the UDP message and sends the UDP message to the first node for the first node to restore all the sessions before the first node is online.

In the method in this embodiment, a cold synchronization mechanism is introduced to support the cold synchronization of all sessions between any two nodes in the cluster. Even when the service traffic of the client is not continuous, all the sessions of the second node may be synchronized, and a connection to the client does not need to be reestablished, thereby ensuring the integrity of session synchronization and improving synchronization efficiency.

Embodiment Five

Figure 10:
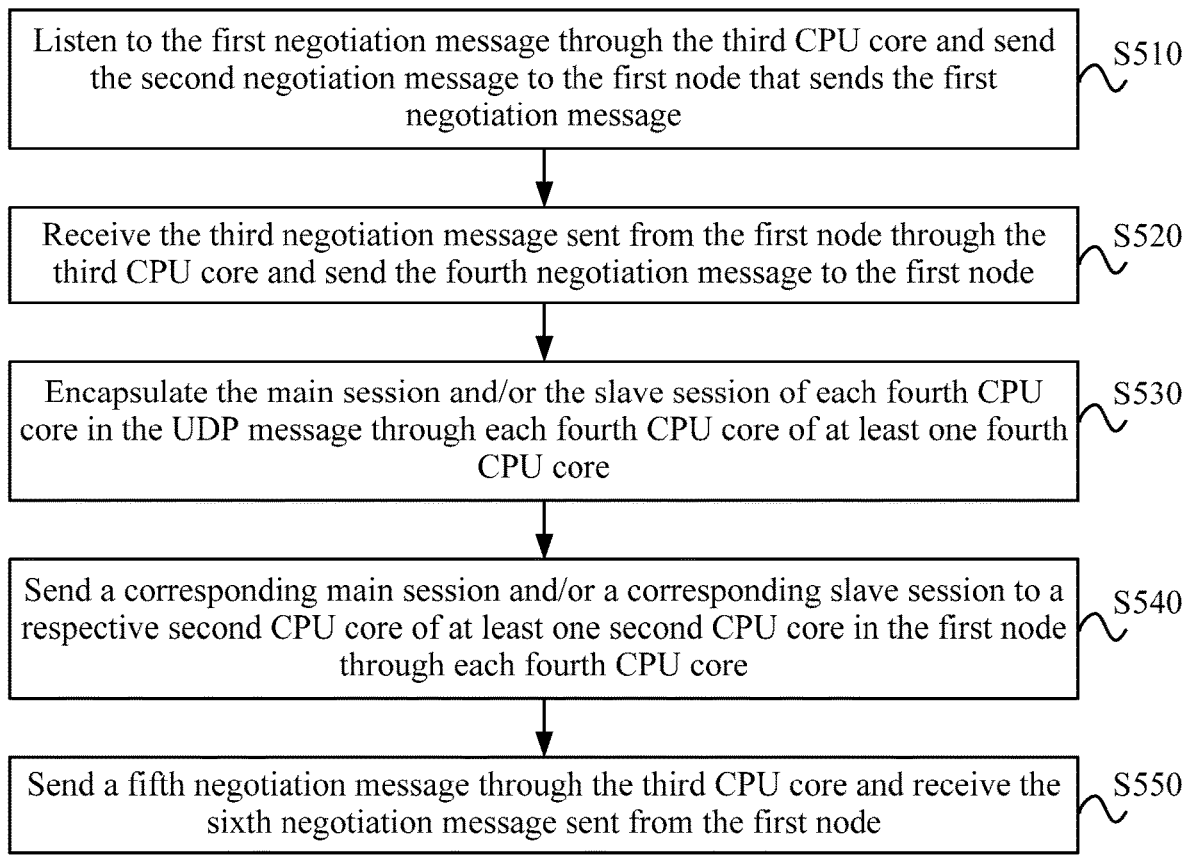
FIG. 10 is a flowchart of a session synchronization method according to embodiment five of the present disclosure.

FIG. 10 is a flowchart of a session synchronization method according to embodiment five of the present disclosure. Based on the preceding embodiments, embodiment five describes the cold synchronization negotiation process and the corresponding synchronization process between WCs of different nodes.

In this embodiment, the second node includes at least one fourth CPU core. Encapsulating the session of the second node in the UDP message through the fourth CPU core and sending the UDP message to the first node includes that: through each fourth CPU core, encapsulating the main session and/or the slave session of each fourth CPU core in the UDP message and sending a corresponding main session and/or a corresponding slave session to a respective second CPU core of at least one second CPU core in the first node. The forwarding of UDP messages among different WCs in a node is avoided through the corresponding synchronization between each WC of the first node and a respective WC of the second node, so that the HA performance is improved.

In this embodiment, after the UDP message is sent to the first node, the method also includes sending the fifth negotiation message through the third CPU core and receiving the sixth negotiation message sent from the first node through the third CPU core. The fifth negotiation message and the sixth negotiation message are exchanged to determine the number of sessions to be synchronized, and the cold synchronization negotiation state machine is combined to improve the reliability of session cold synchronization.

For the content not detailed in this embodiment, reference may be made to the preceding embodiments.

As shown in FIG. 10, a session synchronization method provided in embodiment five of the present disclosure includes the operations S510-S550 below.

In S510, through the third CPU core, the first negotiation message is listened to, and the second negotiation message is sent to the first node that sends the first negotiation message.

In S520, through the third CPU core, the third negotiation message sent from the first node is received and the fourth negotiation message is sent to the first node.

In S530, through each fourth CPU core, the main session and/or the slave session of each fourth CPU core is encapsulated in the UDP message.

In S540, through each fourth CPU core, the corresponding main session and/or the corresponding slave session is sent to a respective second CPU core in the first node.

In S550, through the third CPU core, the fifth negotiation message is sent and the sixth negotiation message sent from the first node is received.

In an embodiment, the UDP message is sent to the first node by that: a cold synchronization single channel connection to the first node is established; and the UDP message is sent in batches based on the cold synchronization single channel through the fourth CPU core. The UDP message includes the session establishment message of the main session and/or the session establishment message of the slave session of the second node. On this basis, the first node establishes the single channel connection based on the UDP to the second node. A node may transmit a message with the best effort, without a sequence number or an acknowledgement number, and does not need a switch, which is applicable to a classic network and a virtual network.

In an embodiment, the method also includes refreshing the cold synchronization negotiation state machine of the second node through the fourth CPU core each time a session establishment message in the UDP message is sent.

Through the fourth CPU core, the cold synchronization negotiation state machine of the second node is refreshed each time the session establishment message in the UDP message is sent, to determine whether the second node is in the process of session cold synchronization until the UDP message is sent, and a next cold synchronization negotiation state machine is entered.

In an embodiment, sending the UDP message in batches includes: starts a cold synchronization timer through the fourth CPU core; and sending the UDP message in batches according to the cold synchronization timer.

In this embodiment, during session cold synchronization, each WC of the second node starts a cold synchronization timer, uses the main session and slave session of each WC as RTOs, encapsulates the RTOs in a UDP message in batches, and sends the RTOs to the corresponding WC of the first node through the HC. Each WC of the first node establish a session corresponding to each WC of the second node according to the received UDP message and determines the session as a slave session. The UDP message may be sent in batches at a fixed time until all sessions of each WC of the second node are sent. Each WC of the second node stops the cold synchronization timer and notifies the second node that the cold synchronization is ended. A cold synchronization timer may be used to determine the number of sessions to be synchronized and whether there are lost or missed sessions. Through a cold synchronization timer check mechanism, even in the case where a message is transmitted with the best effort, without a sequence number or an acknowledgement number, the integrity and reliability of session synchronization can be ensured.

In an embodiment, the method also includes allocating a port to the third CPU core and a port to the fourth CPU core and configuring a triplet message filtering rule for the third CPU core and a triplet message filtering rule for the fourth CPU core through the network card. The UDP message of A0-WCx is directly forwarded through an FDIR to the network card queue associated with corresponding B0-WCx through the network card, and the UDP message is directly processed by B0-WCx, thereby improving the session synchronization efficiency.

In a session synchronization method provided in embodiment five of the present disclosure, the first node establishes the single channel connection based on the UDP to the second node. Anode may transmit a message as much as possible without a sequence number or an acknowledgement number, and does not need a switch, which is applicable to a virtual network. The fifth negotiation message and the sixth negotiation message are exchanged to determine the number of sessions to be synchronized, and the cold synchronization negotiation state machine is combined to improve the reliability of session cold synchronization. The forwarding of UDP messages among different WCs in a node is avoided through the corresponding synchronization between each WC of the first node and a respective WC of the second node, so that the HA performance and synchronization efficiency are improved. For a long connection session, the session may be upgraded in real time according to service traffic to effectively manage the session. On the basis of session cold synchronization, combined with hot synchronization, the reliability and flexibility of session synchronization are improved.

Embodiment Six

Figure 11:
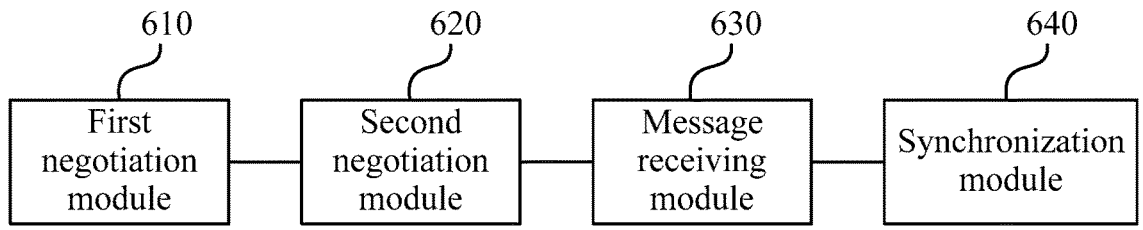
FIG. 11 is a structural diagram of a session synchronization apparatus according to embodiment six of the present disclosure.

FIG. 11 is a structural diagram of a session synchronization apparatus according to embodiment six of the present disclosure. For the content not detailed in this embodiment, reference may be made to the preceding embodiments.

As shown in FIG. 11, the apparatus includes a first negotiation module 610, a second negotiation module 620, a message receiving module 630, and a synchronization module 640.

The first negotiation module 610 is configured to send the first negotiation message to each of the nodes in the cluster through the first CPU core and determine the second node according to at least one received second negotiation message.

The second negotiation module 620 is configured to send the third negotiation message to the second node through the first CPU core.

The message receiving module 630 is configured to, in the case where the fourth negotiation message sent from the second node is received through the first CPU core, receive the UDP message sent from the second node through the second CPU core.

The synchronization module 640 is configured to synchronize the session of the second node according to the UDP message through the second CPU core.

In the session synchronization apparatus provided in this embodiment, the cold synchronization mechanism is introduced to support the cold synchronization of all sessions between any two nodes in the cluster. Even when the service traffic of the client is not continuous, all the sessions of the second node may be synchronized, and the connection to the client does not need to be reestablished, thereby ensuring the integrity of session synchronization and improving synchronization efficiency.

For the content not detailed in this embodiment, reference may be made to embodiment one.

Based on above, the first negotiation module 610 includes a node determination unit.

The node determination unit is configured to determine the second node through the first CPU core according to the peer IP address included in the first one of the at least one received second negotiation message.

Based on above, the message receiving module 630 includes a first connection unit and a receiving unit.

The first connection unit is configured to, in the case where the fourth negotiation message sent from the second node is received through the first CPU core, establish the cold synchronization single channel connection to the second node.

The receiving unit is configured to receive the UDP message sent from the second node in batches through the second CPU core based on the cold synchronization single channel. The UDP message includes the session establishment message of the main session and/or the session establishment message of the slave session of the second node.

Based on above, the apparatus also includes a first refresh module.

The first refresh module is configured to refresh the cold synchronization negotiation state machine of the first node through the second CPU core each time the session establishment message in the UDP message is received.

Based on above, the first communication node comprises at least one second CPU core.

The UDP message encapsulates the main session and/or the slave session of each fourth CPU core in the second node.

The synchronization module 640 is configured to establish a corresponding session through each second CPU core of the at least one second CPU core according to the main session and/or the slave session of a respective fourth CPU core of at least one fourth CPU core in the second node and determine the corresponding session established as the slave session of each second CPU core.

Based on above, the apparatus also includes a session upgrading module.

The session upgrading module is configured to, after the session of the second node is synchronized according to the UDP message, receive the service message of a client through each second CPU core of the at least one second CPU core and determine a slave session of each second CPU core, hit by the service message, as the main session of each second CPU core.

Based on above, the apparatus also includes a fifth negotiation module.

The fifth negotiation module is configured to, after the session of the second node is synchronized according to the UDP message, receive the fifth negotiation message sent from the second node through the first CPU core and send the sixth negotiation message to the second node.

Based on above, the apparatus also includes a hot synchronization module.

The hot synchronization module is configured to receive the service message of the client through the second CPU core and synchronize the session established or closed through the second CPU core to each of the nodes in the cluster in real time or at a fixed time according to the service message.

Based on above, the apparatus also includes a first allocation module.

The first allocation module is configured to allocate a corresponding port to the first CPU core and a corresponding port to the second CPU core and configure a triplet message filtering rule for the first CPU core and the triplet message filtering rule for the second CPU core through a network card.

The preceding session synchronization apparatus may execute the session synchronization method according to any embodiment of the present disclosure and has functional modules and effects corresponding to the method executed.

Embodiment Seven

Figure 12:
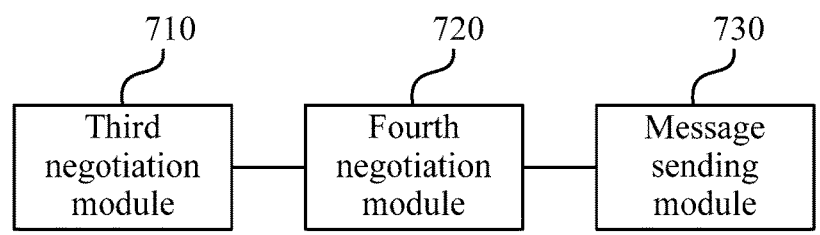
FIG. 12 is a structural diagram of a session synchronization apparatus according to embodiment seven of the present disclosure.

FIG. 12 is a structural diagram of a session synchronization apparatus according to embodiment seven of the present disclosure. For the content not detailed in this embodiment, reference may be made to the preceding embodiments.

As shown in FIG. 12, the apparatus includes a third negotiation module 710, a fourth negotiation module 720, and a message sending module 730.

The third negotiation module 710 is configured to listen to the first negotiation message through the third CPU core and send the second negotiation message to the first node that sends the first negotiation message.

The fourth negotiation module 720 is configured to receive the third negotiation message sent from the first node through the third CPU core and send the fourth negotiation message to the first node.

The message sending module 730 is configured to encapsulate the session of the second node in the UDP message through the fourth CPU core and send the UDP message to the first node.

In the session synchronization apparatus provided in this embodiment, the cold synchronization mechanism is introduced to support the cold synchronization of all sessions between any two nodes in the cluster. Even when the service traffic of the client is not continuous, all the sessions of the second node may be synchronized, and the connection to the client does not need to be reestablished, thereby ensuring the integrity of session synchronization and improving synchronization efficiency.

Based on the above, the message sending module 730 includes a second connection unit and a first sending unit. The second connection unit is configured to establish the cold synchronization single channel connection to the first node.

The first sending unit is configured to send the UDP message in batches through the fourth CPU core based on the cold synchronization single channel. The UDP message includes the session establishment message of the main session and/or the session establishment message of the slave session of the second node.

Based on the above, the apparatus also includes a second refresh module. The second refresh module is configured to refresh the cold synchronization negotiation state machine of the second node through the fourth CPU core each time the session establishment message in the UDP message is sent.

Based on the above, the message sending module 730 includes a second sending unit. The second sending unit is configured to start the cold synchronization timer through the fourth CPU core and send the UDP message in batches according to the cold synchronization timer.

Based on the above, the session synchronization apparatus includes at least one fourth CPU core.

The message sending module 730 includes an encapsulation unit and a sending unit. The encapsulation unit is configured to encapsulate the main session and/or the slave session of each fourth CPU core in the UDP message through each fourth CPU core.

The sending unit is configured to send the corresponding main session and/or the corresponding slave session to the corresponding second CPU core in the first node through each fourth CPU core.

Based on above, the apparatus also includes a sixth negotiation module. The sixth negotiation module is configured to, after the UDP message is sent to the first node, send the fifth negotiation message through the third CPU core and receive the sixth negotiation message sent from the first node.

Based on above, the apparatus also includes a second allocation module. The second allocation module is configured to allocate the port to the third CPU core and the port to the fourth CPU core and configure the triplet message filtering rule for the third CPU core and the triplet message filtering rule for the fourth CPU core through the network card.

The preceding session synchronization apparatus may execute the session synchronization method according to any embodiment of the present disclosure and has functional modules and effects corresponding to the method executed.

Embodiment Eight

Figure 13:
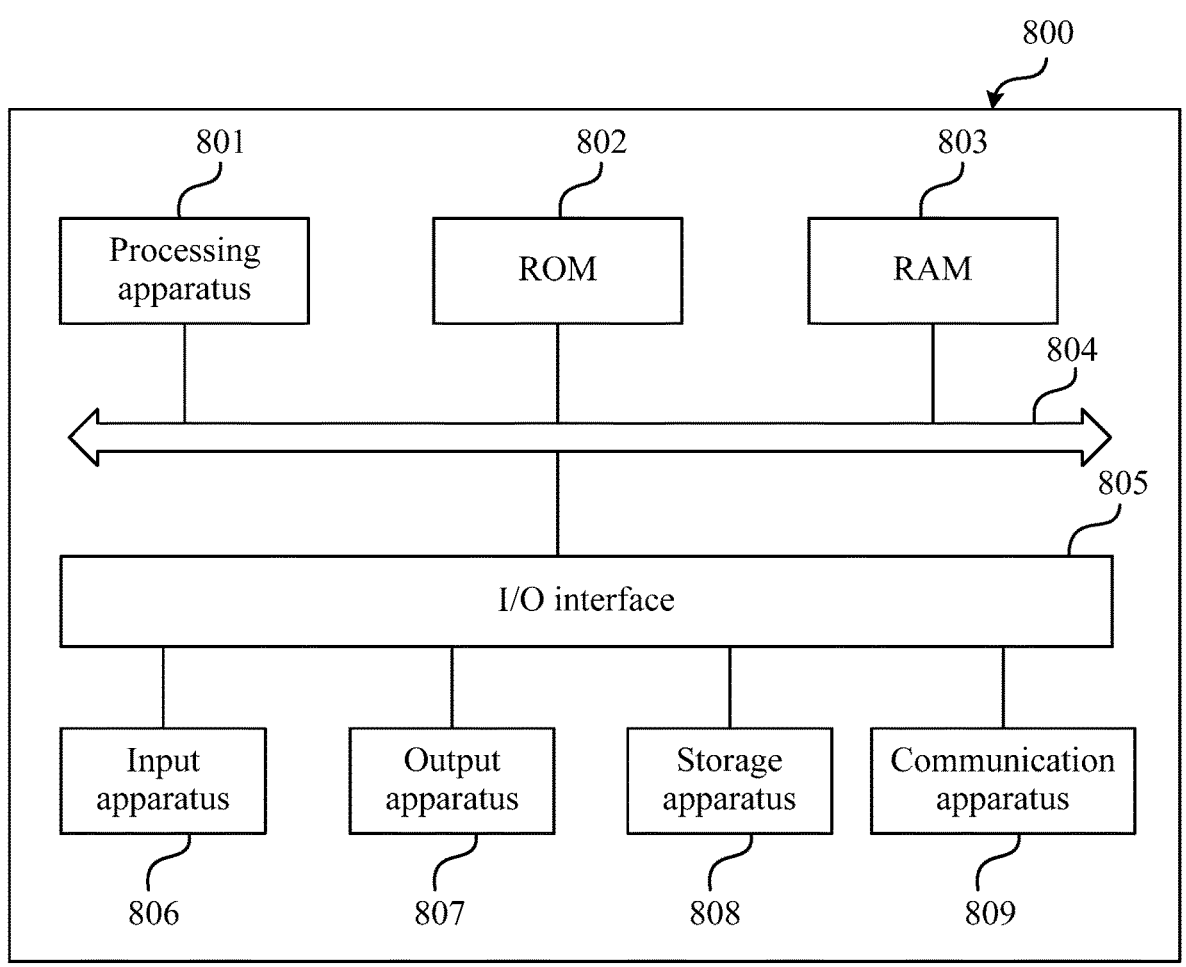
FIG. 13 is a structural diagram of a first node according to embodiment eight of the present disclosure.

FIG. 13 is a structural diagram of a first node according to embodiment eight of the present disclosure. FIG. 13 illustrates the structure of the first node 800 applicable to implementing embodiments of the present disclosure. The first node 800 in the embodiments of the present disclosure includes an access gateway or a load balancer. The first node 800 shown in FIG. 13 is merely an example and should not impose any limitation on the functionality and scope of use of the embodiments of the present disclosure.

As shown in FIG. 13, the first node 800 may include one or more processing apparatuses (such as a central processing unit and a graphics processing unit) 801. The one or more processing apparatuses 801 may execute a program, which is stored in a read-only memory (ROM) 802 or loaded into a random access memory (RAM) 803 from a storage apparatus 808, to perform various appropriate actions and processing. The one or more processing apparatuses 801 implements the methods provided in the present disclosure. Various programs and data required for operations of the first node 800 may also be stored in the RAM 803. The one or more processing apparatuses 801, the ROM 802, and the RAM 803 are connected to each other through a bus 804.

An input/output (I/O) interface 805 is also connected to the bus 804. The following apparatuses may be connected to an I/O interface 805: an input apparatus 806 such as a touch screen, a touch pad, a keyboard, a mouse, a camera, a microphone, an accelerometer, and a gyroscope; an output apparatus 807 such as a liquid crystal display (LCD), a speaker, and a vibrator; the storage apparatus 808, such as a magnetic tape and a hard disk, that is configured to store one or more programs; and a communication apparatus 808. The communication apparatus 809 may allow the first node 800 to perform wireless or wired communication with other devices to exchange data. FIG. 13 shows the first node 800 having various apparatuses, but it is not necessary to implement or be equipped all the shown apparatuses. In an embodiment, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried in a computer-readable medium. The computer program includes program codes for performing the method shown in the flowchart. In such an embodiment, the computer program may be downloaded from a network and installed through the communication apparatus 809, or may be installed from the storage apparatus 808, or may be installed from the ROM 802. When the computer program is executed by the processing apparatus 801, the preceding functions defined in the methods of the embodiments of the present disclosure are executed.

Embodiment Nine

Figure 14:
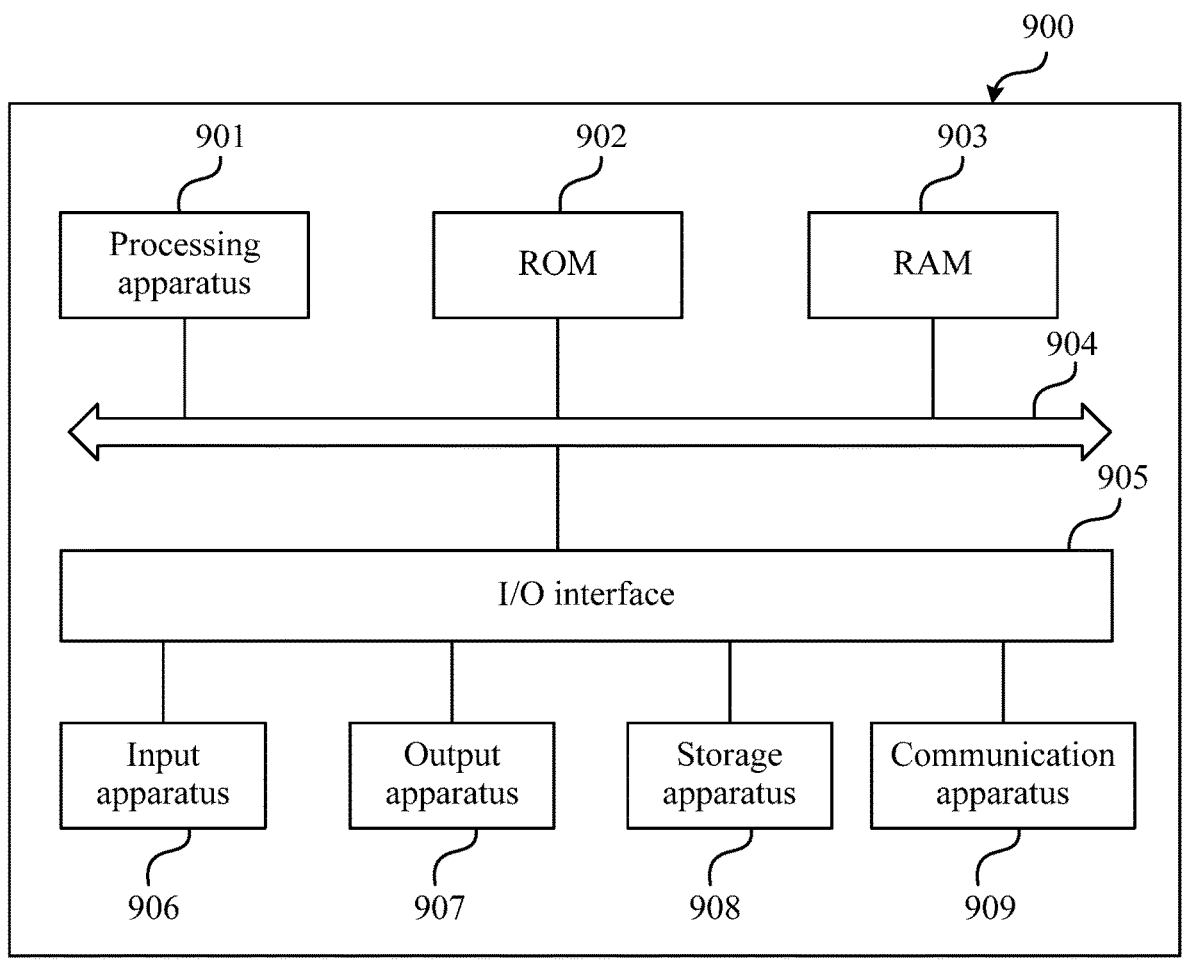
FIG. 14 is a structural diagram of a second node according to embodiment nine of the present disclosure.

FIG. 14 is a structural diagram of a second node according to embodiment nine of the present disclosure. FIG. 14 illustrates the structure of the second node 900 applicable to implementing the embodiments of the present disclosure. The second node 800 in the embodiments of the present disclosure includes an access gateway or a load balancer. The second node 900 shown in FIG. 14 is merely an example and should not impose any limitation on the functionality and scope of use of the embodiments of the present disclosure.

As shown in FIG. 14, the second node 900 may include one or more processing apparatuses (such as a central processing unit and a graphics processing unit) 901. The one or more processing apparatuses 901 may execute a program, which is stored in a ROM 902 or loaded into a RAM 903 from a storage apparatus 808, to perform various appropriate actions and processing. The one or more processing apparatuses 901 implements the methods provided in the present disclosure. Various programs and data required for operations of the second node 900 may also be stored in the RAM 903. The one or more processing apparatuses 901, the ROM 902, and the RAM 903 are connected to each other through a bus 904. An I/O interface 905 is also connected to the bus 904.

The following apparatuses may be connected to an I/O interface 905: an input apparatus 906 such as a touch screen, a touch pad, a keyboard, a mouse, a camera, a microphone, an accelerometer, and a gyroscope; an output apparatus 907 such as an LCD, a speaker, and a vibrator; the storage apparatus 908, such as a magnetic tape and a hard disk, that is configured to store one or more programs; and a communication apparatus 909. The communication apparatus 909 may allow the second node 900 to perform wireless or wired communication with other devices to exchange data. FIG. 14 shows the second node 900 having various apparatuses, but it is not necessary to implement or be equipped all the shown apparatuses. In an embodiment, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried in a computer-readable medium. The computer program includes program codes for performing the method shown in the flowchart. In such an embodiment, the computer program may be downloaded from a network and installed through the communication apparatus 909, or may be installed from the storage apparatus 908, or may be installed from the ROM 902. When the computer program is executed by the processing apparatus 901, the preceding functions defined in the methods of the embodiments of the present disclosure are executed.

Embodiment Ten

Figure 15:
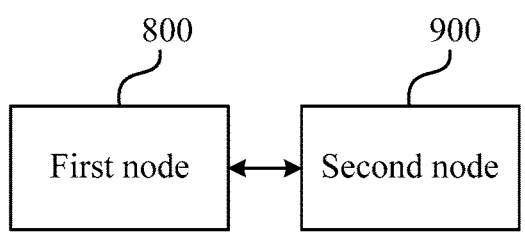
FIG. 15 is a structural diagram of a session synchronization system according to embodiment ten of the present disclosure.

FIG. 15 is a structural diagram of a session synchronization system according to embodiment ten of the present disclosure. The system is applicable to the case of session synchronization in the load balance cluster, for example, the case where the cold synchronization of a session between different nodes of the four-layer load balancer cluster is performed in a unicast manner.

As shown in FIG. 15, the system includes a first node 800 and a second node 900. The first node 800 and the second node 900 are deployed in the same virtual Internet protocol (VIP).

In the session synchronization system provided in this embodiment, the cold synchronization mechanism is introduced to support the cold synchronization of all sessions between any two nodes in the cluster. Even when the service traffic of the client is not continuous, all the sessions of the second node may be synchronized, and the connection to the client does not need to be reestablished, thereby ensuring the integrity of session synchronization and improving synchronization efficiency.

The first node 800 is configured to: send the first negotiation message to each of the nodes in the cluster and determines the second node 900 according to at least one received second negotiation message through the first CPU core; send the third negotiation message through the first CPU core to the second node 900; in the case where the fourth negotiation message sent from the second node 900 is received through the first CPU core, receive the UDP message sent from the second node 900 through the second CPU core; and synchronize the session of the second node 900 according to the UDP message through the second CPU core.

Based on the above, the first node 800 determines the second node 900 through the first CPU core according to the peer IP address included in the first one of the at least one received second negotiation message.

Based on the above, in the case where the fourth negotiation message sent from the second node 900 is received through the first CPU core, the first node 800 establishes the cold synchronization single channel connection to the second node 900. The UDP message sent from the second node 900 is received in batches based on the cold synchronization single channel through the second CPU core. The UDP message includes the session establishment message of the main session and/or the session establishment message of the slave session of the second node 900.

Based on the above, the first node 800 refreshes the cold synchronization negotiation state machine of the first node 800 through the second CPU core each time the session establishment message in the UDP message is received.

Based on the above, the first node comprises at least one second CPU core. The main session and/or the slave session of each fourth CPU core in the second node 900 is encapsulated in the UDP message.

The first node 800 establishes the corresponding session through each of the at least one second CPU core according to the main session and/or the slave session of respective fourth CPU core in the second node 900, and the corresponding session established is determined as a slave session of the first node 800.

Based on the above, the first node 800 receives the service message of a client through each of the at least one second CPU core and determines the slave session of the first node 800, hit by the service message, as a main session of the first node 800.

Based on the above, the first node 800 receives a fifth negotiation message sent from the second node 900 and sends a sixth negotiation message to the second node 900 through the first CPU core.

Based on the above, the first node 800 receives the service message of the client through the second CPU core and synchronizes the session established or closed through the second CPU core to each of the nodes in the cluster in real time or at a fixed time according to the service message.

Based on the above, the first node 800 allocates a corresponding port to the first CPU core and a corresponding port to the second CPU core and configures a triplet message filtering rule for the first CPU core and a triplet message filtering rule for the second CPU core through a network card.

The second node 900 listens to the first negotiation message through a third CPU core and sends the second negotiation message to the first node 800 that sends the first negotiation message.

The third negotiation message sent from the first node 800 is received through the third CPU core and the fourth negotiation message is sent through the third CPU core to the first node 800.

The fourth CPU core encapsulates the session of the second node 900 in the UDP message, and the UDP message is sent to the first node 800.

Based on above, the second node 900 establishes the cold synchronization single channel connection to the first node 800.

The UDP message is sent in batches based on the cold synchronization single channel through the fourth CPU core. The UDP message includes a session establishment message of a main session of the second node 900 and/or a session establishment message of a slave session of the second node 900.

Based on the above, the second node 900 refreshes the cold synchronization negotiation state machine of the second node 900 through the fourth CPU core each time the session establishment message in the UDP message is sent.

Based on the above, the second node 900 starts the cold synchronization timer through the fourth CPU core and sends the UDP message in batches according to the cold synchronization timer.

Based on above, the second node 900 includes at least one fourth CPU core. The second node 900 encapsulates the main session and/or the slave session of each fourth CPU core in the UDP message through each fourth CPU core.

Through each fourth CPU core, a corresponding main session and/or a corresponding slave session is sent to a respective second CPU core in the first node 800.

Based on above, the second node 900 sends the fifth negotiation message through the third CPU core and receives the sixth negotiation message sent from the first node 800.

Based on above, the second node 900 allocates a port to the third CPU core and a port to the fourth CPU core and configures a triplet message filtering rule for the third CPU core and a triplet message filtering rule for the fourth CPU core through a network card.

The preceding session synchronization system may implement the session synchronization method according to any embodiment of the present disclosure and has functional modules and effects corresponding to the method executed.

A computer-readable medium provided by the present disclosure may be a computer-readable signal medium or a computer-readable storage medium or any combination thereof. The computer-readable storage medium may be an electronic, magnetic, optical, electromagnetic, infrared or semiconductor system, apparatus or device, or any combination thereof. The computer-readable storage medium may include: an electrical connection having one or more wires, a portable computer magnetic disk, a hard disk, a RAM, a ROM, an erasable programmable read-only memory (EPROM) or a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. This propagated data signal may use multiple forms including an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including a wire, an optical cable, a Radio Frequency (RF), or any suitable combination thereof. The storage medium may be a non-transitory storage medium.

The preceding computer-readable medium may be included in the preceding first node 800 or the preceding second node 900 and may also exist independently and not be assembled into the first node 800 or the second node 900.

The preceding computer-readable medium carries one or more programs. When the one or more programs are executed by an electronic device, the first node 800 sends the first negotiation message to each of the nodes in the cluster and determines the second node according to the received second negotiation message through the first CPU core; sends the third negotiation message to the second node through the first CPU core; in the case where the fourth negotiation message sent from the second node is received through the first CPU core, receives the UDP message sent from the second node through the second CPU core; and synchronizes the session of the second node through the second CPU core according to the UDP message. In an embodiment, the second node 900 listens to the first negotiation message and sends the second negotiation message to the first node that sends the first negotiation message through the third CPU core; receives the third negotiation message sent from the first node and sends the fourth negotiation message to the first node through the third CPU core; and encapsulates the session of the second node in the UDP message and sends the UDP message to the first node through the fourth CPU core.

Computer program codes for performing the operations in the present disclosure may be written in one or more programming languages or combination thereof. The preceding one or more programming languages include object-oriented programming languages such as Java, Smalltalk, and C++, as well as conventional procedural programming languages such as "C" or similar programming languages. Program codes may be executed entirely on a user computer, partly on a user computer, as a stand-alone software package, partly on a user computer and partly on a remote computer, or entirely on a remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show possible architectures, functions, and operations of the system, method and computer program product according to multiple embodiments of the present disclosure. Each block in the flowcharts or block diagrams may represent a module, a program segment, or part of codes that contains one or more executable instructions for implementing specified logical functions. In some alternative implementations, the functions marked in the blocks may occur in an order different from that marked in the drawings. For example, two successive blocks may, in fact, be executed substantially in parallel or in a reverse order, which depends on the functions involved. Each block of the block diagrams and/or flowcharts, and combinations of blocks in the block diagrams and/or flowcharts may be implemented by a dedicated hardware-based system that performs a specified function or operation, or be implemented by a combination of dedicated hardware and computer instructions.

The described modules involved in the embodiments of the present disclosure may be implemented in software or in hardware. The name of a module is not intended to limit the module in a circumstance.

The functions described above herein may be executed, at least partially, by one or more hardware logic components. For example, exemplary types of hardware logic components that may be used include a field programmable gate array (FPGA), an application specific integrated circuit (ASIC), application specific standard parts (ASSP), a System-on-a-Chip (SOC), and a complex programmable logic device (CPLD).

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include an electronic, magnetic, optical, electromagnetic, infrared or semiconductor system, apparatus or device, or any suitable combination thereof. The machine-readable storage medium may include an electrical connection based on one or more wires, a portable computer disk, a hard disk, a RAM, a ROM, an EPROM, a flash memory, an optical fiber, a portable CD-ROM, an optical storage device, a magnetic storage device, or any suitable combination thereof.

According to one or more embodiments of the present disclosure, example 1 provides a session synchronization method. The method is applied to the first node and includes:
  sending a first negotiation message to at least one node in a cluster through a first central processing unit (CPU) core and determining a second node according to at least one received second negotiation message;
  sending a third negotiation message to the second node through the first CPU core;
  in a case where a fourth negotiation message sent from the second node is received through the first CPU core, receiving a user datagram protocol (UDP) message sent from the second node through a second CPU core; and
  synchronizing a session of the second node through the second CPU core according to the UDP message.

According to one or more embodiments of the present disclosure, in example 2, according to the method described in example 1, the determining the second node according to the at least one received second negotiation message includes:
  determining the second node through the first CPU core according to a peer Internet protocol (IP) address comprised in a first one of the at least one received second negotiation message.

According to one or more embodiments of the present disclosure, in example 3, according to the method described in example 1, in the case where the fourth negotiation message sent from the second node is received through the first CPU core, receiving the UDP message sent from the second node through the second CPU core includes:
  in the case where the fourth negotiation message sent from the second node is received through the first CPU core, establishing a cold synchronization single channel connection to the second node; and
  receiving the UDP message sent from the second node in batches through the second CPU core based on the cold synchronization single channel, where the UDP message comprises at least one of: a main session of a session establishment message of the second node or a slave session of a session establishment message of the second node.

According to one or more embodiments of the present disclosure, in example 4, according to the method described in example 3, the method also includes:
  refreshing a cold synchronization negotiation state machine of the first node through the second CPU core each time the session establishment message in the UDP message is received.

According to one or more embodiments of the present disclosure, in example 5, according to the method described in example 1, the first communication node comprises at least one second CPU core, at least one of a main session or a slave session of each fourth CPU core of at least one fourth CPU core in the second node is encapsulated in the UDP message, and synchronizing the session of the second node according to the UDP message through the second CPU core includes:
  establishing a corresponding session through each second CPU core of the at least one second CPU core according to at least one of a main session or a slave session of a respective fourth CPU core of the at least one fourth CPU core in the second node, and determining the corresponding session established as a slave session of the first node.

According to one or more embodiments of the present disclosure, in example 6, according to the method described in example 5, after synchronizing the session of the second node according to the UDP message, the method further includes:
  receiving a service message of a client through each second CPU core, and determining the slave session of the first node, hit by the service message, as a main session of the first node.

According to one or more embodiments of the present disclosure, in example 7, according to the method described in example 1, after synchronizing the session of the second node according to the UDP message, the method further includes:
  receiving a fifth negotiation message sent from the second node through the first CPU core and sending a sixth negotiation message to the second node through the first CPU core.

According to one or more embodiments of the present disclosure, in example 8, according to the method described in example 1, the method also includes:

receiving a service message of a client through the second CPU core, and synchronizing a session established or closed through the second CPU core according to the service message to each of the nodes in the cluster in real time or at a fixed time.

According to one or more embodiments of the present disclosure, in example 9, according to the method described in example 1, the method also includes:

allocating a corresponding port to the first CPU core and a corresponding port to the second CPU core and configuring a triplet message filtering rule for the first CPU core and a triplet message filtering rule for the second CPU core through a network card.

According to one or more embodiments of the present disclosure, example 10 provides a session synchronization method. The method is applied to a second node and includes:

listening to a first negotiation message through a third central processing unit (CPU) core and sending a second negotiation message to a first node that sends the first negotiation message;

receiving a third negotiation message sent from the first node through the third CPU core and sending a fourth negotiation message to the first node through the third CPU core; and encapsulating a session of the second node in a user datagram protocol (UDP) message through a fourth CPU core and sending the UDP message to the first node.

According to one or more embodiments of the present disclosure, in example 11, according to the method described in example 10, sending the UDP message to the first node includes:

establishing a cold synchronization single channel connection to the first node; and sending the UDP message in batches through the fourth CPU core based on the cold synchronization single channel, where the UDP message includes at least one of: a main session of a session establishment message of the second node or a slave session of a session establishment message of the second node.

According to one or more embodiments of the present disclosure, in example 12, according to the method described in example 11, the method also includes:

refreshing a cold synchronization negotiation state machine of the second node through the fourth CPU core each time the session establishment message in the UDP message is sent.

According to one or more embodiments of the present disclosure, in example 13, according to the method described in example 11, sending the UDP message in batches includes:

starting a cold synchronization timer through the fourth CPU core; and sending the UDP message in batches according to the cold synchronization timer.

According to one or more embodiments of the present disclosure, in example 14, according to the method described in example 10, the second node includes at least one fourth CPU core; and encapsulating the session of the second node in the UDP message through the fourth CPU core and sending the UDP message to the first node includes:

encapsulating at least one of a main session or a slave session of each fourth CPU core of the at least one fourth CPU core in the UDP message through the each fourth CPU core; and sending the at least one of the main session or the slave session of the each fourth CPU core to a respective second CPU core of at least one second CPU core in the first node through the each fourth CPU core.

According to one or more embodiments of the present disclosure, in example 15, according to the method described in example 10, after sending the UDP message to the first node, the method also includes:

sending a fifth negotiation message through the third CPU core and receiving a sixth negotiation message sent from the first node through the third CPU core.

According to one or more embodiments of the present disclosure, in example 16, according to the method described in example 10, the method also includes:

allocating a port to the third CPU core and a port to the fourth CPU core and configuring a triplet message filtering rule for the third CPU core and a triplet message filtering rule for the fourth CPU core through a network card.

According to one or more embodiments of the present disclosure, example 17 provides a session synchronization apparatus. The apparatus includes a first negotiation module, a second negotiation module, a message receiving module, and a synchronization module.

The first negotiation module is configured to configured to send a first negotiation message to at least one node in a cluster through a first CPU core and determine a second node according to at least one received second negotiation message.

The second negotiation module is configured to send a third negotiation message to the second node through the first CPU core.

The message receiving module is configured to, in a case where a fourth negotiation message sent from the second node is received through the first CPU core, receive a user datagram protocol (UDP) message sent from the second node through a second CPU core.

The synchronization module is configured to synchronize a session of the second node according to the UDP message through the second CPU core.

According to one or more embodiments of the present disclosure, example 18 provides a session synchronization apparatus. The apparatus includes a third negotiation module, a fourth negotiation module, and a message sending module.

The third negotiation module is configured to listen to a first negotiation message through a third CPU core and send a second negotiation message to a first node that sends the first negotiation message.

The fourth negotiation module is configured to receive a third negotiation message sent from the first node through the third CPU core and send a fourth negotiation message to the first node through the third CPU core.

The message sending module is configured to encapsulate a session of the second node in a user datagram protocol (UDP) message through a fourth CPU core and send the UDP message to the first node.

According to one or more embodiments of the present disclosure, example 19 provides a first node. The first node includes one or more processors and a storage apparatus configured to store one or more programs.

When executing the one or more programs, the one or more processors perform the session synchronization method according to any one of examples 1 to 9.

According to one or more embodiments of the present disclosure, example 20 provides a second node. The second node includes one or more processors and a storage apparatus configured to store one or more programs.

When executing the one or more programs, the one or more processors perform the session synchronization method according to any one of examples 10 to 16.

According to one or more embodiments of the present disclosure, example 21 provides a session synchronization system. The system includes the first node according to example 19 and the second node according to example 20.

The first node and the second node are deployed in the same virtual Internet protocol (VIP).

According to one or more embodiments of the present disclosure, example 22 provides a computer-readable storage medium. The storage medium stores a computer program. The computer program, when executed by a processor performs the session synchronization method according to any one of examples 1 to 16.

What is claimed is:

1. A session synchronization method, applied to a first node, comprising:
    sending a first negotiation message to each of nodes in a cluster through a first central processing unit (CPU) core and determining a second node according to at least one received second negotiation message; and
    sending a third negotiation message to the second node through the first CPU core; and
    wherein a fourth negotiation message sent from the second node is received through the first CPU core, and the method further comprises:
    receiving a user datagram protocol (UDP) message sent from the second node through a second CPU core; and
    synchronizing a session of the second node through the second CPU core according to the UDP message.

2. The method according to claim 1, wherein determining the second node according to the at least one received second negotiation message comprises:
    determining the second node through the first CPU core according to a peer Internet protocol (IP) address comprised in a first one of the at least one received second negotiation message.

3. The method according to claim 1, wherein in the case where the fourth negotiation message sent from the second node is received through the first CPU core, receiving the UDP message sent from the second node through the second CPU core comprises:
    in the case where the fourth negotiation message sent from the second node is received through the first CPU core, establishing a cold synchronization single channel connection to the second node; and
    receiving the UDP message sent from the second node in batches through the second CPU core based on the cold synchronization single channel, wherein the UDP message comprises at least one of: a main session of a session establishment message of the second node or a slave session of a session establishment message of the second node.

4. The method of claim 3, further comprising:
    refreshing a cold synchronization negotiation state machine of the first node through the second CPU core each time the session establishment message in the UDP message is received.

5. The method according to claim 1, wherein the first node comprises at least one second CPU core;
    at least one of a main session or a slave session of each fourth CPU core of at least one fourth CPU core in the second node is encapsulated in the UDP message; and
    synchronizing the session of the second node according to the UDP message through the second CPU core comprises:
    establishing a corresponding session through each second CPU core of the at least one second CPU core according to at least one of a main session or a slave session of a respective fourth CPU core of the at least one fourth CPU core in the second node, and determining the corresponding session established as a slave session of the first node.

6. The method according to claim 5, wherein after synchronizing the session of the second node according to the UDP message, the method further comprises:
    receiving a service message of a client through the each second CPU core, and determining the slave session of the first node, hit by the service message, of the each second CPU core as a main session of the first node.

7. The method according to claim 1, wherein after synchronizing the session of the second node according to the UDP message, the method further comprises:
    receiving a fifth negotiation message sent from the second node through the first CPU core and sending a sixth negotiation message to the second node through the first CPU core.

8. The method of claim 1, further comprising:
    receiving a service message of a client through the second CPU core, and synchronizing a session established or closed through the second CPU core according to the service message to each of the nodes in the cluster in real time or at a fixed time.

9. The method of claim 1, further comprising:
    allocating a corresponding port to the first CPU core and a corresponding port to the second CPU core and configuring a triplet message filtering rule for the first CPU core and a triplet message filtering rule for the second CPU core through a network card.

10. A session synchronization method, applied to a second node, comprising:
    listening to a first negotiation message through a third central processing unit (CPU) core and sending a second negotiation message to a first node that sends the first negotiation message;
    receiving a third negotiation message sent from the first node through the third CPU core and sending a fourth negotiation message to the first node through the third CPU core; and
    encapsulating a session of the second node in a user datagram protocol (UDP) message through a fourth CPU core and sending the UDP message to the first node.

11. The method according to claim 10, wherein sending the UDP message to the first node comprises:
    establishing a cold synchronization single channel connection to the first node; and
    sending the UDP message in batches through the fourth CPU core based on the cold synchronization single channel, wherein the UDP message comprises at least one of: a main session of a session establishment message of the second node or a slave session of a session establishment message of the second node.

12. The method of claim 11, further comprising:
refreshing a cold synchronization negotiation state machine of the second node through the fourth CPU core each time the session establishment message in the UDP message is sent.

13. The method according to claim 11, wherein sending the UDP message in batches comprises:
starting a cold synchronization timer through the fourth CPU core; and
sending the UDP message in batches according to the cold synchronization timer.

14. The method according to claim 10, wherein the second node comprises at least one fourth CPU core; and
encapsulating the session of the second node in the UDP message through the fourth CPU core and sending the UDP message to the first node comprises:
encapsulating at least one of a main session or a slave session of each fourth CPU core of the at least one fourth CPU core in the UDP message through the each fourth CPU core; and
sending the at least one of the main session or the slave session of the each fourth CPU core to a respective second CPU core of at least one second CPU core in the first node through the each fourth CPU core.

15. The method according to claim 10, wherein after sending the UDP message to the first node, the method further comprises:
sending a fifth negotiation message through the third CPU core and receiving a sixth negotiation message sent from the first node through the third CPU core.

16. The method of claim 10, further comprising:
allocating a port to the third CPU core and a port to the fourth CPU core and configuring a triplet message filtering rule for the third CPU core and a triplet message filtering rule for the fourth CPU core through a network card.

17. A first node, comprising:
one or more processors; and
a storage apparatus configured to store one or more programs,
wherein when executing the one or more programs, the one or more processors perform:
sending a first negotiation message to each of nodes in a cluster through a first central processing unit (CPU) core and determining a second node according to at least one received second negotiation message; and
sending a third negotiation message to the second node through the first CPU core; and
wherein a fourth negotiation message sent from the second node is received through the first CPU core, and the one or more processors perform:
receiving a user datagram protocol (UDP) message sent from the second node through a second CPU core; and
synchronizing a session of the second node through the second CPU core according to the UDP message.

18. A second node, comprising:
one or more processors; and
a storage apparatus configured to store one or more programs,
wherein when executing the one or more programs, the one or more processors perform the session synchronization method according to claim 10.

19. A session synchronization system, comprising a first node and the second node according to claim 18, wherein
the first node and the second node are deployed in a same virtual Internet protocol (VIP); and wherein the first node, comprises:
one or more processors; and
a storage apparatus configured to store one or more programs,
wherein when executing the one or more programs, the one or more processors perform:
sending a first negotiation message to each of nodes in a cluster through a first central processing unit (CPU) core and determining a second node according to at least one received second negotiation message;
sending a third negotiation message to the second node through the first CPU core;
in a case where a fourth negotiation message sent from the second node is received through the first CPU core, receiving a user datagram protocol (UDP) message sent from the second node through a second CPU core; and
synchronizing a session of the second node through the second CPU core according to the UDP message.

20. A non-transitory computer-readable medium storing a computer program, wherein the computer program, when executed by a processor, performs the session synchronization method according to claim 1.

* * * * *